(12) United States Patent
Kinoshita et al.

(10) Patent No.: US 12,420,960 B2
(45) Date of Patent: Sep. 23, 2025

(54) AGRICULTURAL SUPPORT SYSTEM AND UNMANNED AERIAL VEHICLE

(71) Applicant: KUBOTA CORPORATION, Osaka (JP)

(72) Inventors: Tomohiro Kinoshita, Sakai (JP); Takanori Morimoto, Sakai (JP); Susumu Umemoto, Sakai (JP); Shinnosuke Ishikawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 149 days.

(21) Appl. No.: 18/208,534

(22) Filed: Jun. 12, 2023

(65) Prior Publication Data

US 2023/0322423 A1 Oct. 12, 2023

Related U.S. Application Data

(63) Continuation of application No. PCT/JP2021/048480, filed on Dec. 27, 2021.

(30) Foreign Application Priority Data

| | | |
|---|---|---|
| Dec. 29, 2020 | (JP) | 2020-219872 |
| Dec. 29, 2020 | (JP) | 2020-219873 |

(Continued)

(51) Int. Cl.
*B64U 40/00* (2023.01)
*A01B 69/00* (2006.01)
(Continued)

(52) U.S. Cl.
CPC .............. *B64U 40/00* (2023.01); *A01B 69/00* (2013.01); *B64U 10/16* (2023.01); *B64U 30/20* (2023.01); *B64U 2101/40* (2023.01); *G05D 1/12* (2013.01)

(58) Field of Classification Search
CPC ........ B64U 40/00; B64U 10/16; B64U 30/20; B64U 2101/40; A01B 69/00; G05D 1/12
See application file for complete search history.

(56) References Cited

U.S. PATENT DOCUMENTS 8,909,389 B2 12/2014 Meyer
2013/0233964 A1* 9/2013 Woodworth ........... B64U 10/60
244/175

(Continued)

FOREIGN PATENT DOCUMENTS

CN 106094873 A 11/2016
CN 108536160 A 9/2018
(Continued)

OTHER PUBLICATIONS

Official Communication issued in corresponding Japanese Patent Application No. 2020-219873, mailed on Nov. 21, 2023.
(Continued)

*Primary Examiner* — Michael D Lang
(74) *Attorney, Agent, or Firm* — Keating & Bennett, LLP

(57) ABSTRACT

An agricultural support system includes an unmanned aerial vehicle including a sensor, and an agricultural machine to travel in an agricultural field. When an abnormality occurs in the unmanned aerial vehicle while the agricultural machine performs work in the agricultural field in cooperation with the unmanned aerial vehicle, the unmanned aerial vehicle or the agricultural machine performs an operation different from an operation during the work.

6 Claims, 33 Drawing Sheets

(30) Foreign Application Priority Data

Dec. 29, 2020 (JP) .................................. 2020-219874
Dec. 29, 2020 (JP) .................................. 2020-219876

(51) Int. Cl.
*B64U 10/16* (2023.01)
*B64U 30/20* (2023.01)
*B64U 101/40* (2023.01)
*G05D 1/00* (2024.01)

(56) References Cited

U.S. PATENT DOCUMENTS

| | | | |
|---|---|---|---|
| 2016/0318607 A1 | 11/2016 | Desai et al. | |
| 2018/0253110 A1 | 9/2018 | Tate | |
| 2020/0148348 A1 | 5/2020 | Bradley et al. | |
| 2021/0163136 A1 | 6/2021 | Wake et al. | |
| 2021/0283439 A1* | 9/2021 | Raucher | G08G 5/74 |

FOREIGN PATENT DOCUMENTS

| | | | | |
|---|---|---|---|---|
| CN | 110325934 A | 10/2019 | | |
| DE | 102014201203 A1 | 7/2015 | | |
| EP | 3414982 A1 * | 12/2018 | | A01B 69/001 |
| JP | 02-60521 A | 3/1990 | | |
| JP | 2004-201588 A | 7/2004 | | |
| JP | 2018-027719 A | 2/2018 | | |
| JP | 2018140704 A | 9/2018 | | |
| JP | 2018-170991 A | 11/2018 | | |
| JP | 2019-028688 A | 2/2019 | | |
| JP | 2019-038535 A | 3/2019 | | |
| JP | 2019-062793 A | 4/2019 | | |
| JP | 2019098788 A | 6/2019 | | |
| JP | 2019-133441 A | 8/2019 | | |
| JP | 2019-166965 A | 10/2019 | | |
| JP | 2019175312 A | 10/2019 | | |
| JP | 2020018255 A | 2/2020 | | |
| KR | 20200065696 A | 6/2020 | | |
| WO | 2019/168042 A1 | 9/2019 | | |

OTHER PUBLICATIONS

Official Communication issued in corresponding Japanese Patent Application No. 2020-219874, mailed on Nov. 21, 2023.
Official Communication issued in corresponding Japanese Patent Application No. 2020-219873, mailed on Jan. 30, 2024.
Official Communication issued in corresponding Japanese Patent Application No. 2020-219874, mailed on Feb. 6, 2024.
Official Communication issued in International Patent Application No. PCT/JP2021/048480, mailed on Mar. 29, 2022.
Official Communication issued in corresponding European Patent Application No. 21915270.9, mailed on Nov. 4, 2024, 8 pages.
Official Communication issued in corresponding Chinese Patent Application No. 202180082311.5, mailed on Jun. 10, 2025, 17 pages.

* cited by examiner

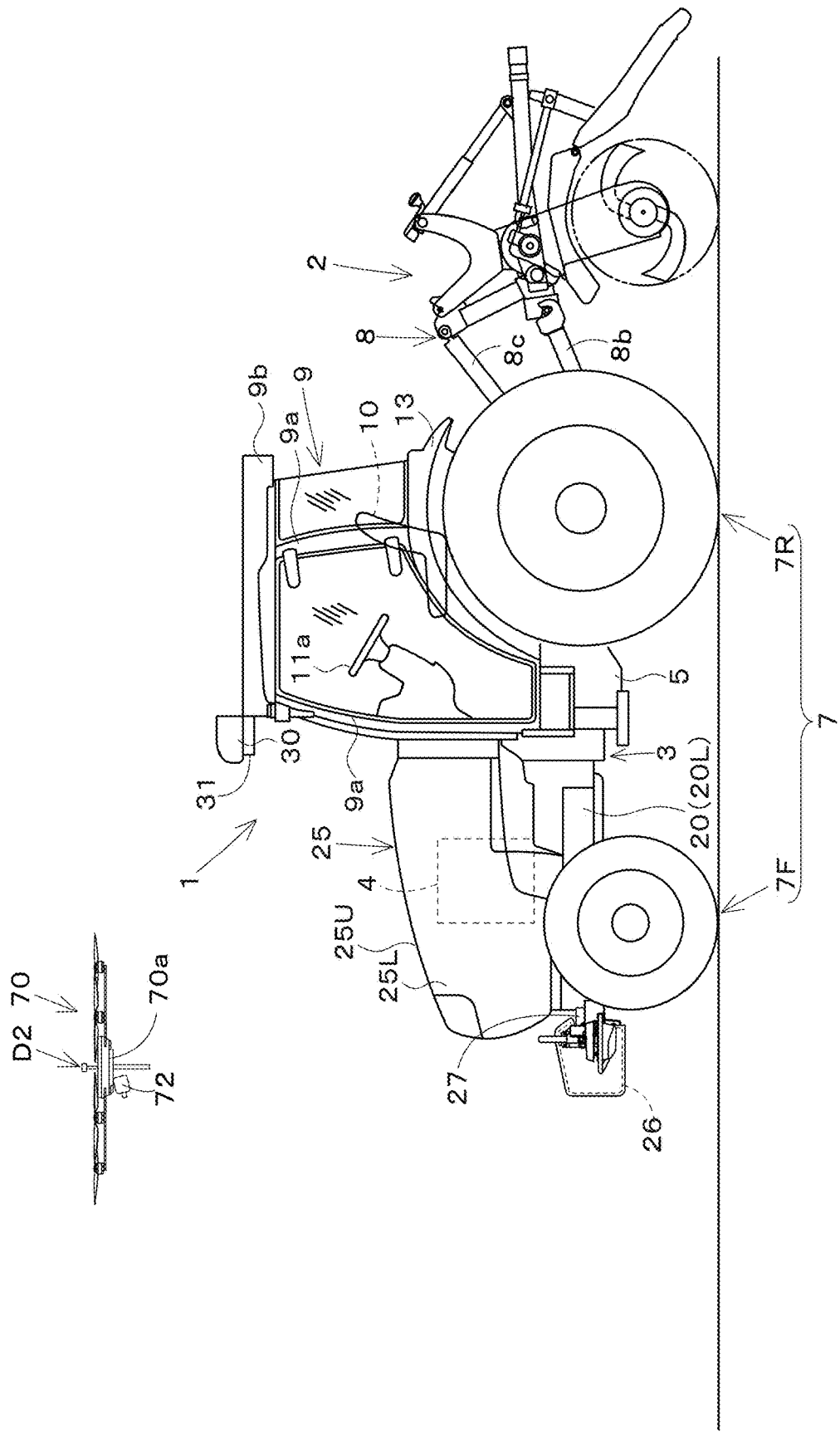

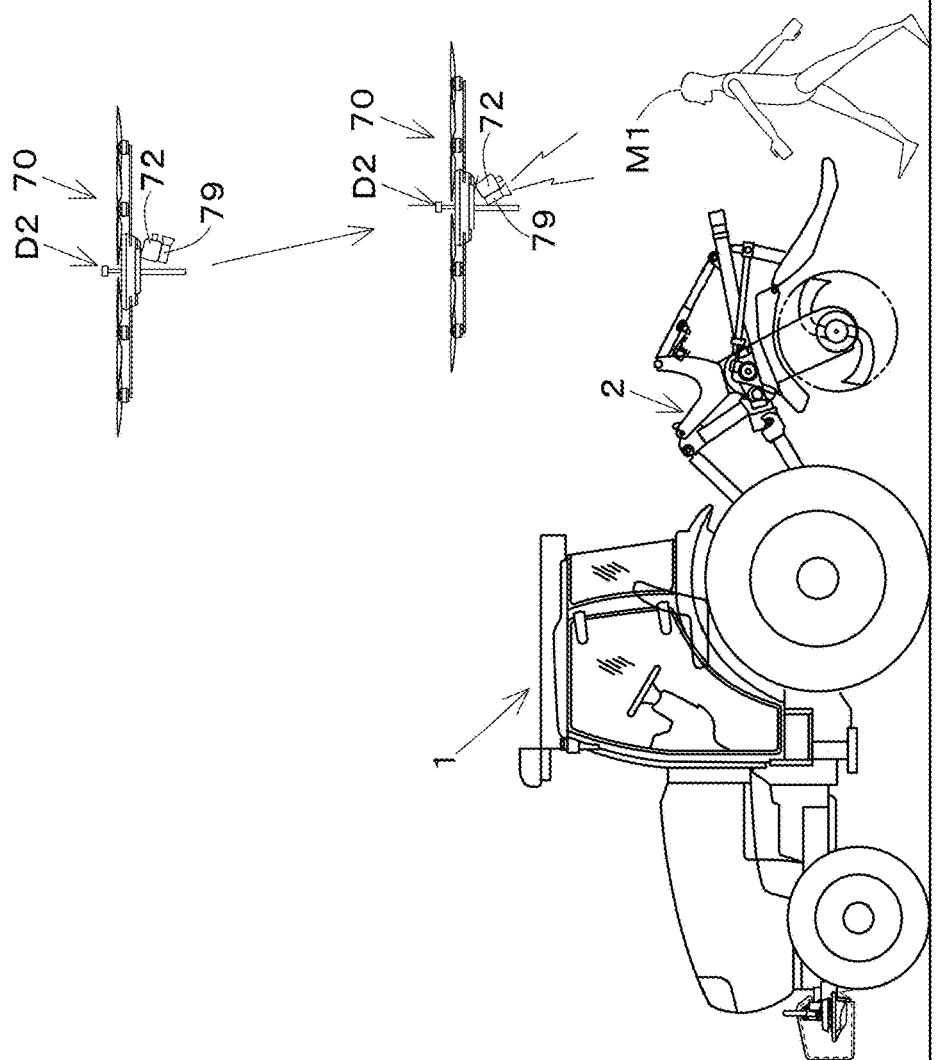

Fig.9C
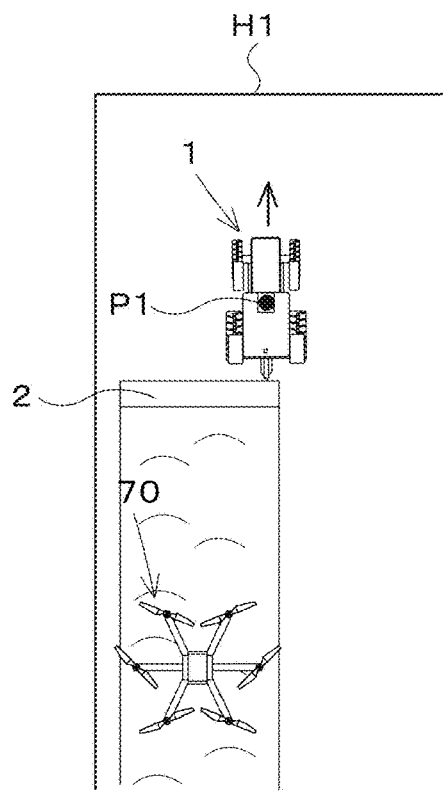
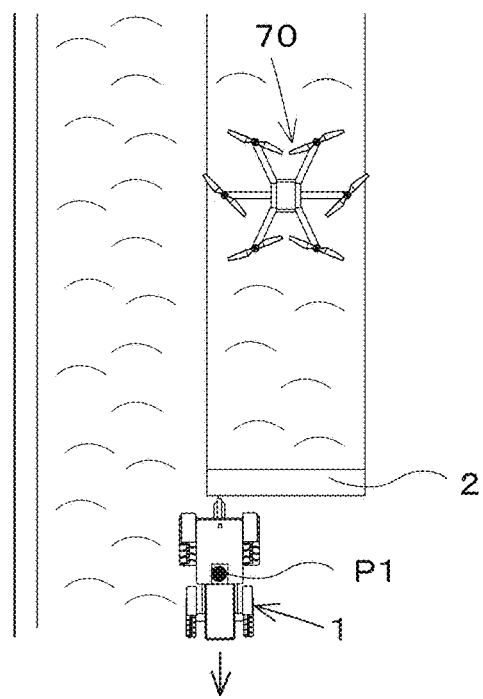

Fig.18A
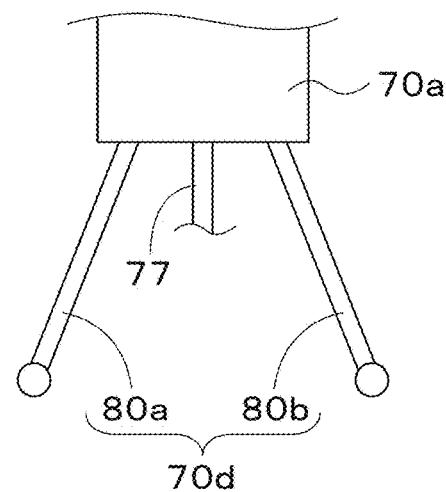
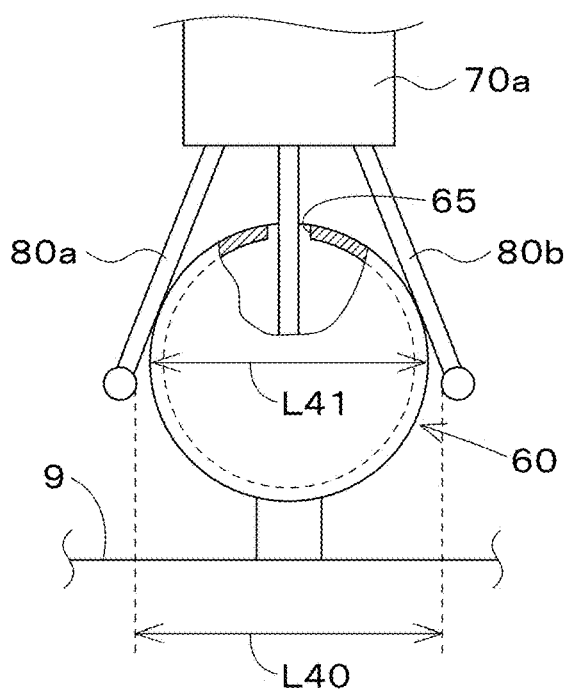

Fig.18B
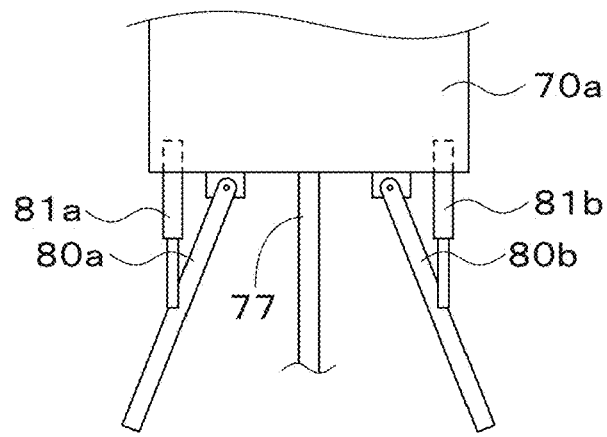
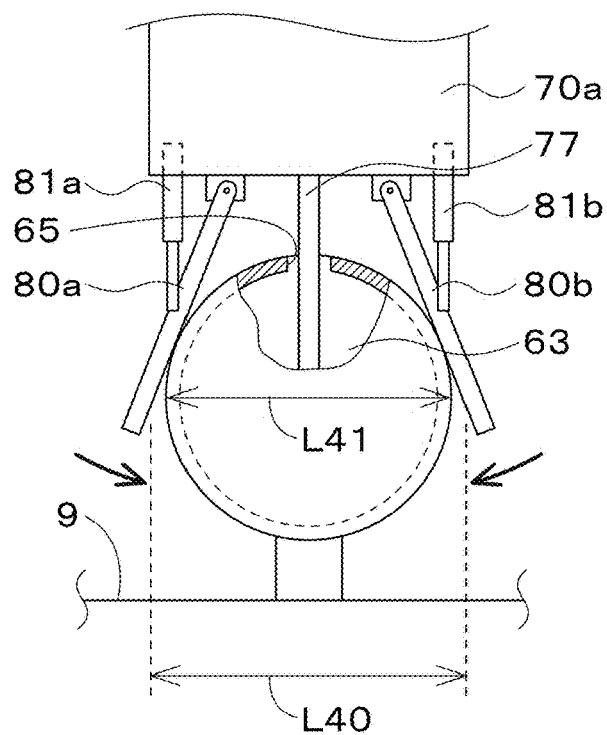

Fig.18C
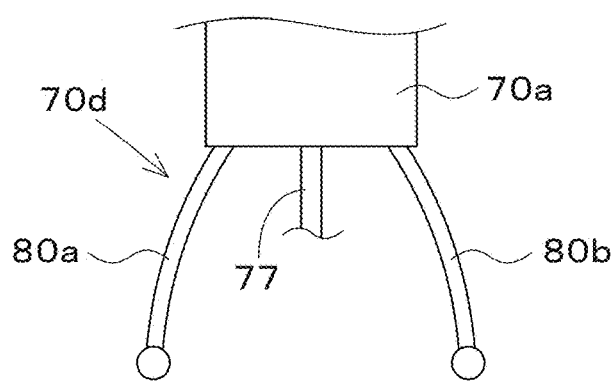
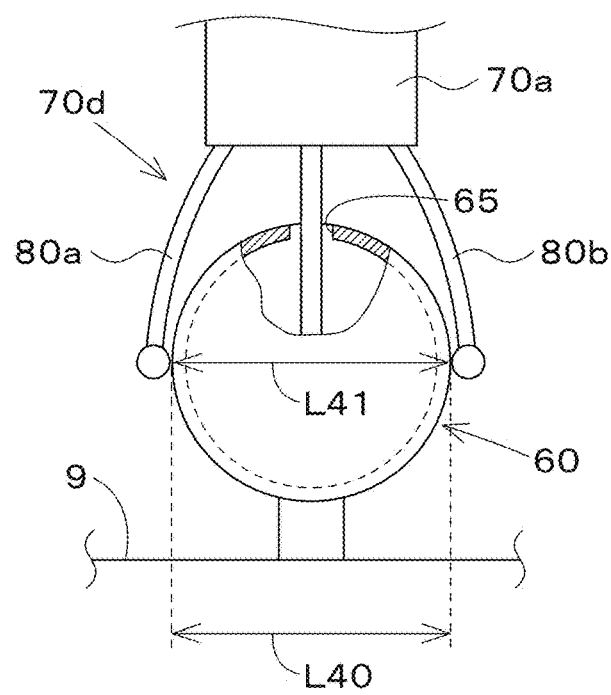

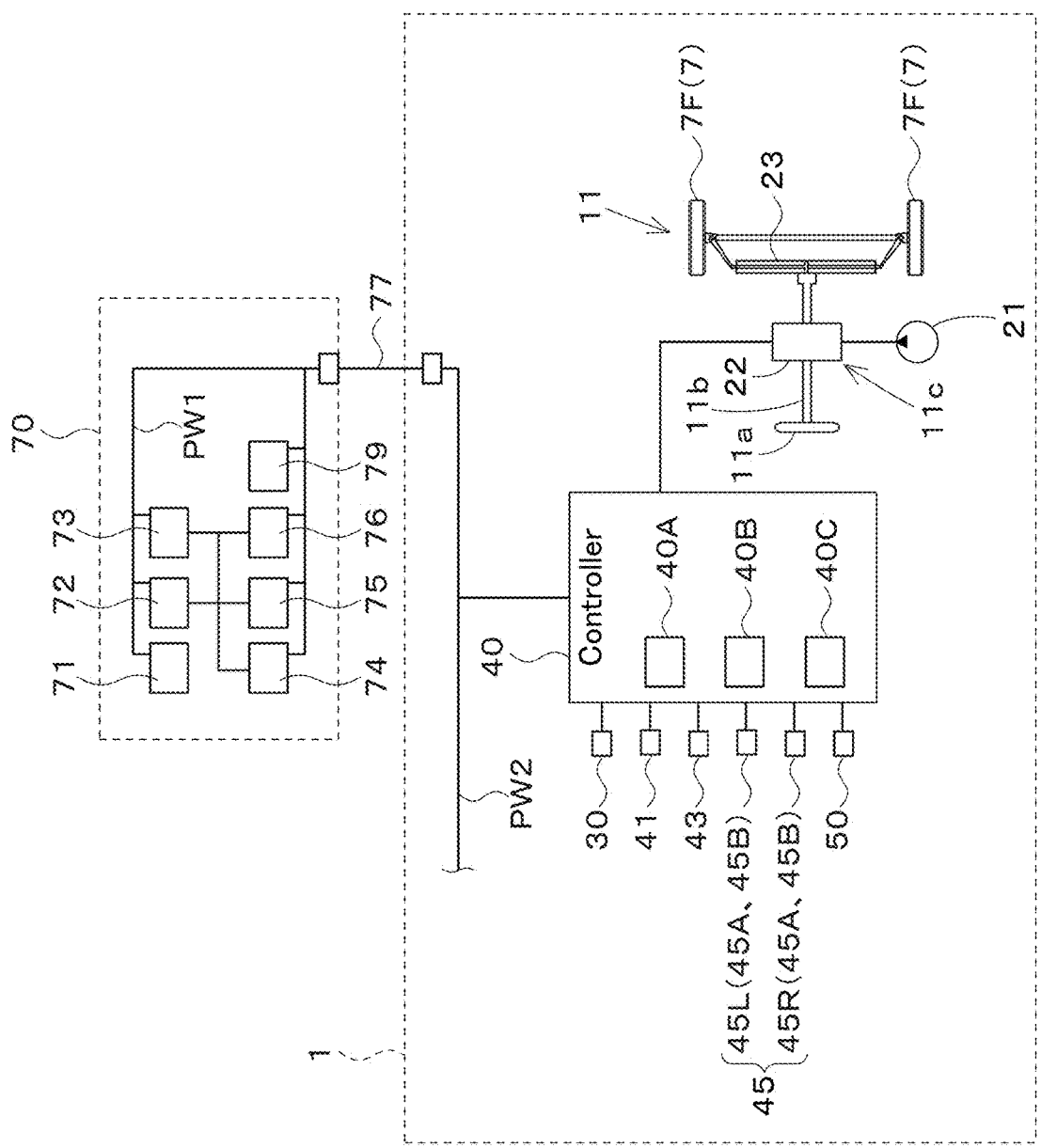

AGRICULTURAL SUPPORT SYSTEM AND UNMANNED AERIAL VEHICLE

CROSS REFERENCE TO RELATED APPLICATIONS

This application is a continuation application of International Application No. PCT/JP2021/048480, filed on Dec. 27, 2021, which claims the benefit of priority to Japanese Patent Application No. 2020-219872, filed on Dec. 29, 2020, to Japanese Patent Application No. 2020-219873, filed on Dec. 29, 2020, to Japanese Patent Application No. 2020-219874, filed on Dec. 29, 2020, and to Japanese Patent Application No. 2020-219876, filed on Dec. 29, 2020. The entire contents of each of these applications are hereby incorporated herein by reference.

BACKGROUND OF THE INVENTION

1. Field of the Invention

The present invention relates to an agricultural support system and an unmanned aerial vehicle.

2. Description of the Related Art

Japanese Unexamined Patent Application Publication No. 2019-133441 discloses a technique for flying a drone above an agricultural machine. A management system for a working vehicle disclosed in Japanese Unexamined Patent Application Publication No. 2019-133441 includes a working vehicle that travels in an agricultural field, an unmanned aircraft that is equipped with a camera and that flies in the air to correspond to the working vehicle, and a mobile terminal device that communicates with the working vehicle and the unmanned aircraft. The mobile terminal device simultaneously displays vehicle information received from the working vehicle and a camera image received from the unmanned aircraft on a display.

SUMMARY OF THE INVENTION

Although Japanese Unexamined Patent Application Publication No. 2019-133441 discloses that the unmanned aircraft such as a drone is caused to fly above the agricultural machine, a situation such as a case where an abnormality or a malfunction occurs in the drone is not actually considered. Also, in Japanese Unexamined Patent Application Publication No. 2019-133441, the drone merely flies above the agricultural machine, and the fact that the drone flies in tandem with the agricultural machine and cooperation (association) with work performed by the working implement are not actually considered. Further, it is not considered that traveling of the agricultural machine is automatically changed based on the result monitored by the drone and that monitoring by the drone and sensing by the agricultural machine are associated with each other when the agricultural machine is automatically traveling.

In view of such circumstances, preferred embodiments of the present invention provide agricultural support systems each capable of appropriately dealing with an abnormality in an unmanned aerial vehicle when an agricultural machine performs work in an agricultural field in cooperation with the unmanned aerial vehicle. Also, in view of such circumstances, preferred embodiments of the present invention also provide unmanned aerial vehicles and agricultural support systems each capable of improving accuracy of monitoring by the unmanned aerial vehicle by changing a flight position in tandem with an operation of an agricultural machine. Further, in view of such circumstances, preferred embodiments of the present invention provide agricultural support systems in each of which, work with a working implement is performed depending on a state of an agricultural field when an unmanned aerial vehicle senses the agricultural field to improve workability or the like in the entire agricultural field. Further, in view of such circumstances, preferred embodiments of the present invention provide agricultural support systems in each of which an obstacle detector changes a detection area for detection of an obstacle based on a result sensed by a sensor of an unmanned aerial vehicle during automatic traveling of an agricultural machine to improve detection of the obstacle during the automatic traveling.

An agricultural support system according to a preferred embodiment of the present invention includes an unmanned aerial vehicle including a sensor, and an agricultural machine to travel in an agricultural field. The unmanned aerial vehicle or the agricultural machine may be operable such that, when an abnormality occurs in the unmanned aerial vehicle while the agricultural machine performs work in the agricultural field in cooperation with the unmanned aerial vehicle, the unmanned aerial vehicle or the agricultural machine performs an operation different from an operation during the work.

The unmanned aerial vehicle may include a position detector to detect a position. The unmanned aerial vehicle may be operable to fly above the agricultural field based on the position detected by the position detector during the work, and stop flying based on the position and fly based on information sensed by the sensor when the abnormality occurs.

The unmanned aerial vehicle may be operable to fly toward a predetermined return location based on the information and land at the return location when the abnormality occurs.

The position detector may be operable to detect the position based on radio waves from one or more positioning satellites. The unmanned aerial vehicle may be operable to determine whether the abnormality has occurred based on an elapsed time during which a reception intensity of the radio waves from the one or more positioning satellites is less than a threshold.

The unmanned aerial vehicle may be operable to determine that the abnormality has occurred when the elapsed time is a predetermined time or more, and determine that the abnormality has not occurred but a malfunction has occurred when the elapsed time is less than the predetermined time.

The unmanned aerial vehicle may be operable to fly based on the position detected by the position detector and the information sensed by the sensor when the malfunction occurs.

The unmanned aerial vehicle may be operable to, when the malfunction occurs, regulate a distance from the unmanned aerial vehicle to the agricultural machine during flight in accordance with the elapsed time.

The agricultural machine may include a PTO shaft to transmit power to a working implement coupled to the agricultural machine, a raising/lowering device to raise and lower the working implement, and a traveling device. The agricultural machine may be operable to rotate the PTO shaft and actuate the raising/lowering device and the traveling device in accordance with the work during the work, and stop at least one of rotation of the PTO shaft, the raising/lowering device, or the traveling device, when the abnormality occurs.

An unmanned aerial vehicle according to a preferred embodiment of the present invention includes a main body, at least one arm provided on the main body, at least one rotor blade provided on the at least one arm, a sensor to sense an agricultural machine during flight in a surrounding area of the agricultural machine, a position detector to detect a flight position that is a position of the position detector, and a controller to change the flight position detected by the position detector by controlling the at least one rotor blade. The controller may be configured or programmed to change the flight position in tandem with an operation of the agricultural machine.

The agricultural machine may include a traveling vehicle body to raise and lower a working implement. The controller may be configured or programmed to change the flight position toward the working implement when the working implement is raised or lowered or moves in a horizontal direction.

The agricultural machine may include a traveling vehicle body to raise and lower a working implement. The controller may be configured or programmed to change the flight position to a position that allows the sensor to sense an area forward of the traveling vehicle body in a direction of travel when the working implement performs ground work.

The controller may be configured or programmed to change the flight position to a position that allows the surrounding area of the agricultural machine to be sensed when the agricultural machine is stopped.

The unmanned aerial vehicle may further include a warning generator to generate and output a warning. The sensor may be operable to capture an image of the surrounding area of the agricultural machine while the agricultural machine is stopped or traveling. The warning generator may be operable to output the warning when the sensor detects a living body.

The controller may be configured or programmed to change the flight position to a surrounding area of the living body when the sensor detects the living body.

The unmanned aerial vehicle may further include a communicator to transmit an instruction to the agricultural machine to stop traveling of the agricultural machine when the sensor detects the living body while the agricultural machine is traveling.

An agricultural support system according to a preferred embodiment of the present invention includes an unmanned aerial vehicle including a sensor, and an agricultural machine including a traveling vehicle body to which a working implement is attachable. The unmanned aerial vehicle may be operable to change a flight position with respect to the agricultural machine in tandem with an operation of the agricultural machine.

The traveling vehicle body may be operable to raise and lower the working implement. The unmanned aerial vehicle may be operable to change the flight position toward the working implement when the working implement is raised or lowered or moves in a horizontal direction.

The traveling vehicle body may be operable to raise and lower the working implement. The unmanned aerial vehicle may be operable to change the flight position to a position that allows an area forward of the traveling vehicle body in a direction of travel to be sensed when the working implement performs ground work.

The unmanned aerial vehicle may be operable to change the flight position to a position that allows a surrounding area of the agricultural machine to be sensed when the agricultural machine is stopped.

The agricultural support system may further include a warning generator to generate and output a warning. The sensor may be operable to capture an image of a surrounding area of the agricultural machine while the agricultural machine is stopped or traveling. The warning generator may be operable to output the warning when the sensor detects a living body.

The unmanned aerial vehicle may be operable to change the flight position to a surrounding area of the living body when the sensor detects the living body.

The agricultural machine may be operable to stop traveling when the sensor detects the living body while the agricultural machine is traveling.

An agricultural support system according to a preferred embodiment of the present invention includes an unmanned aerial vehicle including a sensor, and an agricultural machine to travel in an agricultural field. The agricultural machine is operable to perform work with a working implement based on a state of the agricultural field obtained when the unmanned aerial vehicle senses the agricultural field.

The agricultural machine may be operable to configure the working implement upon acquiring the state of the agricultural field obtained before the work is performed, and perform the work based on the state of the agricultural field upon acquiring the state of the agricultural field obtained while the work is being performed or after the work is performed.

The agricultural support system may further include a work determiner to determine whether the work with the working implement is appropriate based on the state of the agricultural field obtained while the work is performed or after the work is completed. The agricultural machine may be operable to, when the work determiner determines that the work is not appropriate, return to a position at which the work was determined to be not appropriate and perform the work again with the working implement.

The agricultural machine may include a traveling controller to control automatic traveling, and a selector to select whether to perform the work again after the automatic traveling is completed or to perform the work again during the automatic traveling.

The agricultural machine may include a cable to supply electric power to the unmanned aerial vehicle flying in the agricultural field.

The agricultural machine may include a takeoff/landing station where the unmanned aerial vehicle takes off or lands. The unmanned aerial vehicle be operable to take off from the takeoff/landing station at at least one of before the work is performed, while the work is being performed, or after the work is performed, and to sense the state of the agricultural field while the work is being performed and after the work is performed with the sensor.

An agricultural support system according to a preferred embodiment of the present invention includes an obstacle detector provided in or on an agricultural machine to detect an obstacle, a traveling controller provided in or on the agricultural machine to cause the agricultural machine to perform automatic traveling when the obstacle detector does not detect the obstacle and change the automatic traveling when the obstacle detector detects the obstacle, and a sensor provided in or on the unmanned aerial vehicle to sense a situation of an area forward of the agricultural machine in a direction of travel during the automatic traveling of the agricultural machine. The obstacle detector may be operable to change a detection area for obstacle detection based on a result of sensing by the sensor.

The agricultural support system may include a communicator provided in or on the unmanned aerial vehicle to transmit the result of sensing by the sensor to the agricultural machine.

The communicator may be operable to transmit, as the result, information related to a size and a position of a sensed object to the agricultural machine. The obstacle detector may be operable to change the detection area based on the size and the position of the object.

The agricultural support system may further include an irradiator provided in or on the unmanned aerial vehicle to emit light toward the object when the size of the object sensed by the sensor is a predetermined size or more.

The obstacle detector may be operable to set the detection area for the object when the object is irradiated with the light.

The agricultural support system may further include an irradiator provided in or on the unmanned aerial vehicle to emit light in the direction of travel.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 7A is a side view illustrating the unmanned aerial vehicle flying forward of the tractor.

FIG. 9B illustrates a state in which the living body M1 is detected during turning or the like of the tractor.

FIG. 9C illustrates a flight position of the unmanned aerial vehicle when the working implement is moved horizontally.

FIG. 18A illustrates a skid of an unmanned aerial vehicle and a landing station.

FIG. 18B illustrates a skid different from that illustrated in FIG. 18A and the landing station.

FIG. 18C illustrates a skid different from those illustrated in FIGS. 18A and 18B and the landing station.

FIG. 24 is a control block diagram according to the second preferred embodiment of the present invention.

DETAILED DESCRIPTION OF THE PREFERRED EMBODIMENTS

Figure 1:
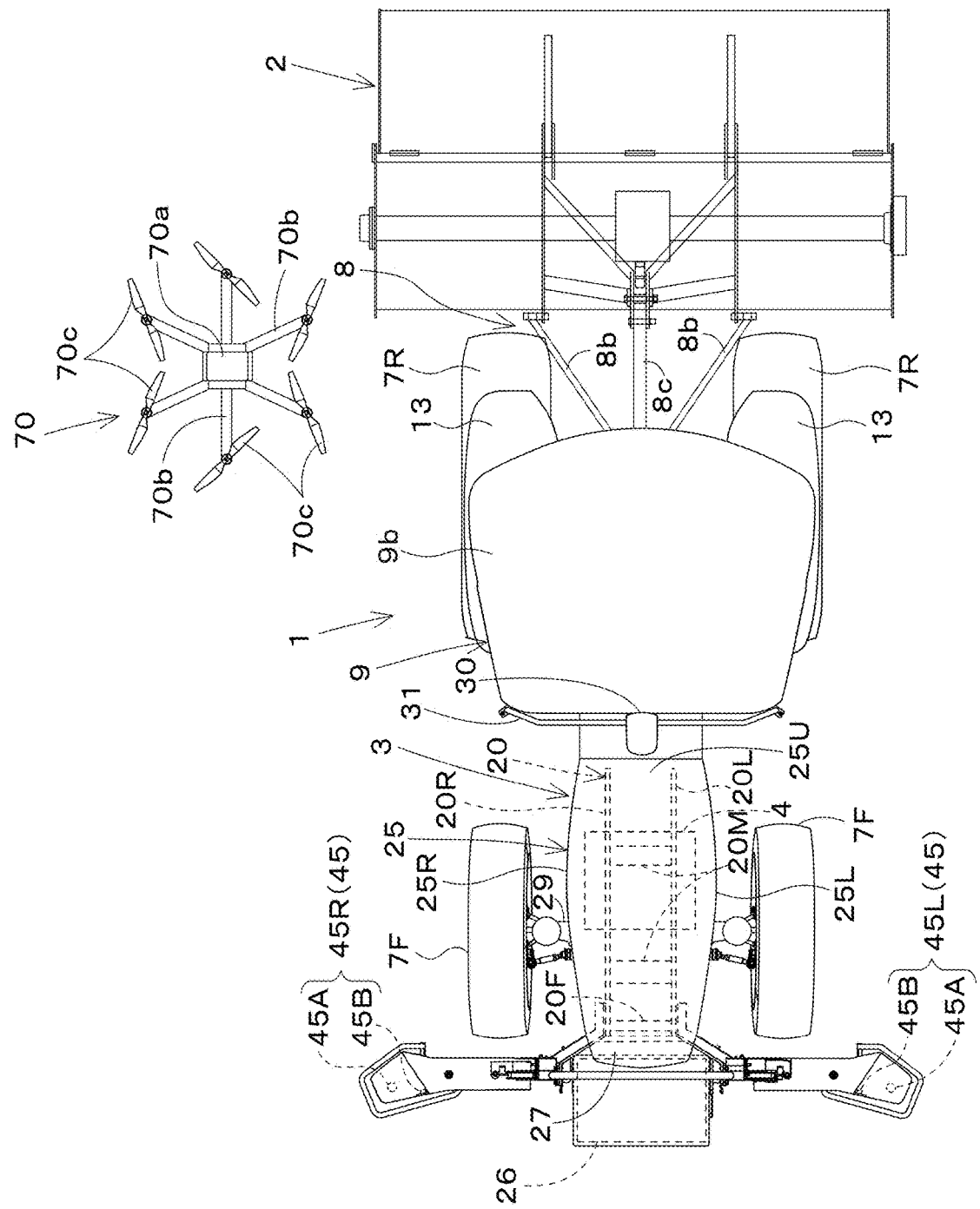
FIG. 1 is an overall plan view of a tractor according to a first preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with reference to the drawings.

First Preferred Embodiment

Figure 2:
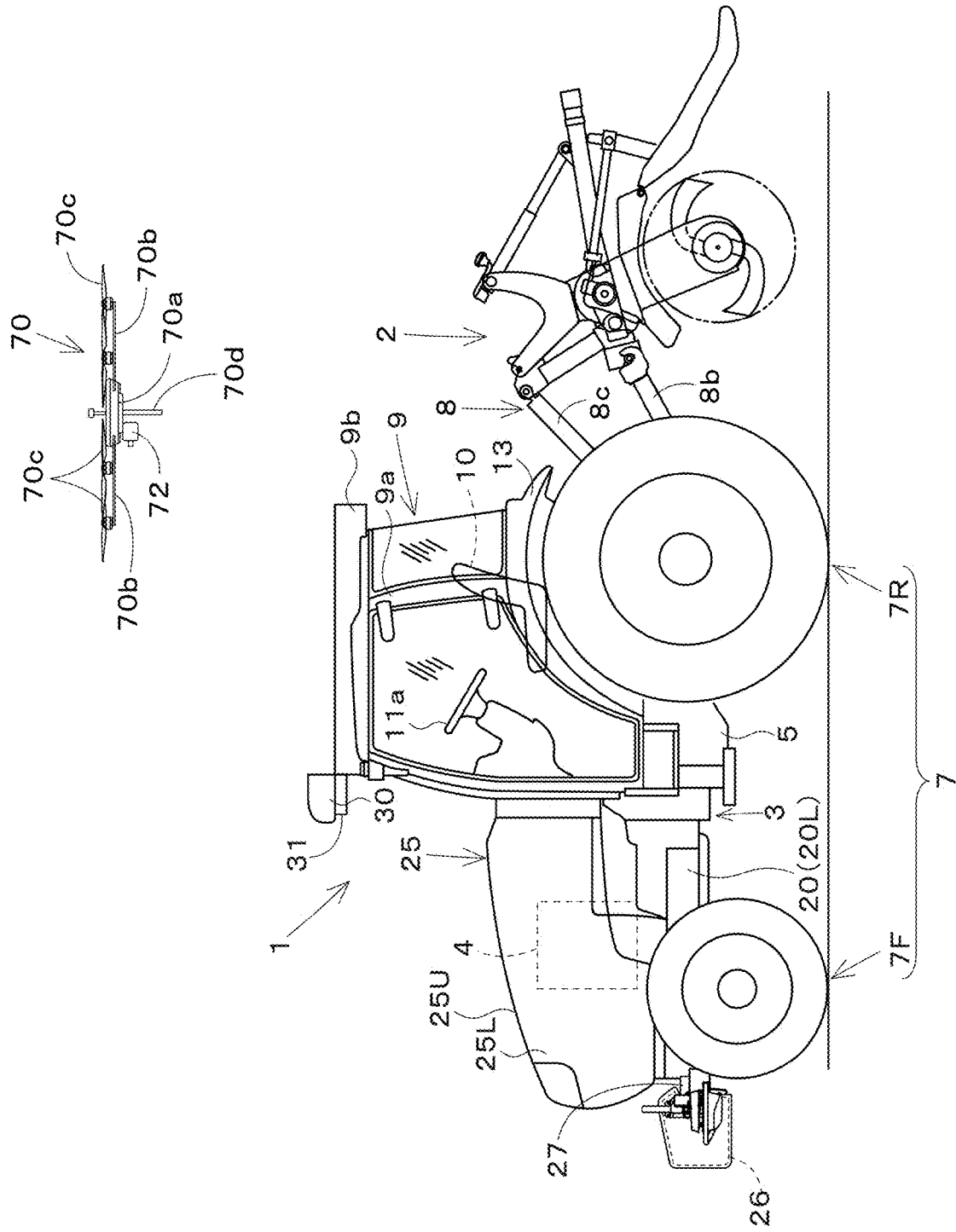
FIG. 2 is an overall side view of the tractor.

FIG. 1 and FIG. 2 illustrate an entire agricultural machine. The agricultural machine is, for example, a tractor, a combine, or a rice transplanter. An agricultural machine will be described using a tractor 1 as an example.

As illustrated in FIG. 1 and FIG. 2, the tractor 1 includes a vehicle body (traveling vehicle body) 3, a prime mover 4, and a transmission 5. The vehicle body 3 is provided with a traveling device 7. The traveling device 7 supports the vehicle body 3 so that the vehicle body 3 can travel, and includes at least one front wheel 7F and a rear wheel 7R. The front wheel 7F and the rear wheel 7R are of a tire type in the case of the present preferred embodiment, but may be of a crawler type. The prime mover 4 is, for example, an engine (diesel engine, gasoline engine) or an electric motor. The transmission 5 can switch the propelling force of the traveling device 7 by speed-changing, and can switch the traveling device 7 between forward traveling and backward traveling. The vehicle body 3 is provided with an operator's seat 10. The operator's seat 10 is protected by a protector 9. The protector 9 is, for example, a cabin that protects the operator's seat 10, or a ROPS that protects the operator's seat 10 by covering at least an area above the operator's seat 10.

As illustrated in FIG. 1 and FIG. 2, the protector 9 includes a plurality of pillars 9a fixed to the vehicle body 3, and a roof 9b supported by the plurality of pillars 9a and disposed above the operator's seat 10. When the protector 9 is a cabin, for example, a glass or a door is provided between the plurality of pillars 9a, and the operator's seat 10 is covered with the glass and the door. A fender 13 is attached below the protector 9. The fender 13 covers an upper portion of the rear wheel 7R.

As illustrated in FIG. 1 and FIG. 2, the vehicle body 3 includes a vehicle body frame 20. The vehicle body frame 20 includes a vehicle body frame 20L provided on the left and a vehicle body frame 20R provided on the right. Each of the vehicle body frame 20L and the vehicle body frame 20R extends forward from a position near the transmission 5, and supports a lower portion of the prime mover 4. The vehicle body frame 20L and the vehicle body frame 20R are separated from each other in a vehicle-body width direction. A front end portion of the vehicle body frame 20L and a front end portion of the vehicle body frame 20R are coupled by a front coupling plate 20F. A middle portion of the vehicle body frame 20L and a middle portion of the vehicle body frame 20R are coupled by a middle coupling plate 20M. The vehicle body frame 20L and the vehicle body frame 20R support a front axle case 29. The front axle case 29 houses a front axle that rotatably supports the front wheel 7F. That is, in the case of the present preferred embodiment, the vehicle body frame 20 is a front axle frame that supports the front axle. Alternatively, the vehicle body frame 20 may be a frame (a frame other than the front axle frame) that supports a structure other than the front axle case 29.

As illustrated in FIG. 1 and FIG. 2, a hood 25 is provided above the vehicle body frame 20. The hood 25 extends in a front-rear direction along the vehicle body frame 20. The hood 25 is disposed forward of a center portion in a width direction of the protector 9. The hood 25 includes a left sidewall 25L provided on the left, a right sidewall 25R provided on the right, and an upper wall 25U that couples upper portions of the left sidewall 25L and the right sidewall 25R. An engine room is provided between the left sidewall 25L, the right sidewall 25R, and the upper wall 25U. The engine room houses the prime mover 4, a cooling fan, a radiator, a battery, and so forth. The front wheel 7F is disposed on each of the left of the left sidewall 25L and the right of the right sidewall 25R.

A weight 26 is provided forward of the hood 25, that is, forward of the vehicle body frames 20L and 20R. The weight 26 is attached to a weight bracket (weight attachment) 27 provided at a front portion of the vehicle body 3. The weight bracket 27 is attached to the front coupling plate 20F of the vehicle body frame 20L by a fastener such as a bolt.

The tractor 1 includes a PTO shaft protruding from a rear portion of the vehicle body 3. The power of the PTO shaft is transmitted to a working implement 2 to drive the working implement 2. The PTO shaft is driven by the power transmitted from the prime mover 4 to the PTO shaft. A PTO driver is provided in the middle of the PTO shaft. The PTO driver is a hydraulic clutch or the like and is switchable between a transmission position in which the power is transmitted to the PTO shaft and a disconnected position in which the power is not transmitted to the PTO shaft. The rotation of the PTO shaft can be stopped by switching the PTO driver (hydraulic clutch) to the disconnected position.

A coupler 8 is provided at the rear portion of the vehicle body 3. The coupler 8 is a device that detachably couples the working implement (implement or the like) 2 with the vehicle body 3. The coupler 8 is, for example, a swinging drawbar that couples the working implement 2 and the vehicle body 3 and does not perform raising or lowering, or a raising/lowering device that includes a three-point linkage or the like and performs raising or lowering. The working implement 2 is, for example, a cultivator for cultivation, a fertilizer spreader for spreading a fertilizer, an agricultural chemical spreader for spreading an agricultural chemical, a harvester for harvesting, a hilling device for hilling, a mower for cutting grass or the like, a tedder for spreading grass or the like, a rake for collecting grass or the like, or a baler for shaping grass or the like.

Figure 3:
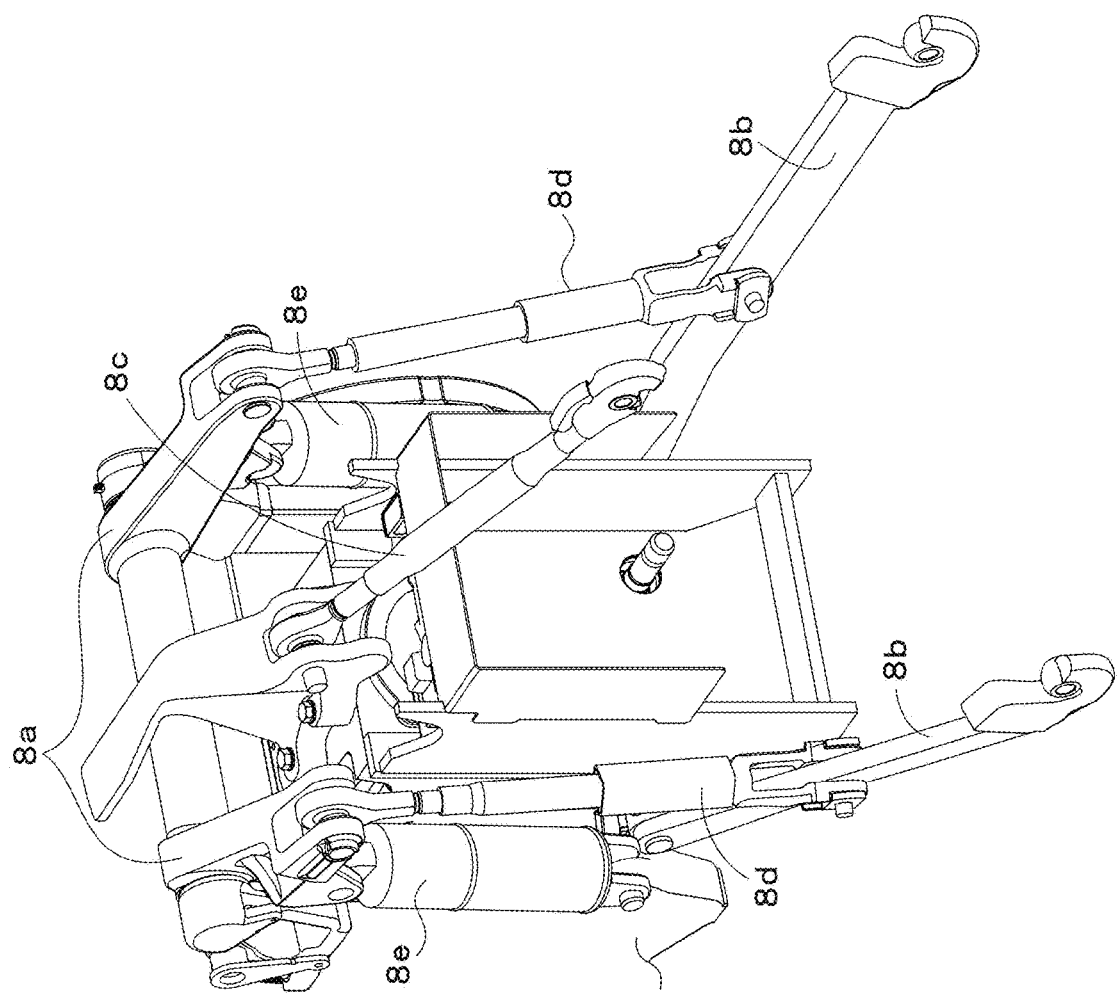
FIG. 3 is a perspective view of a raising/lowering device.

FIG. 3 illustrates the coupler 8 including the raising/lowering device. As illustrated in FIG. 3, the coupler (raising/lowering device) 8 includes a lift arm 8a, a lower link 8b, a top link 8c, a lift rod 8d, and a lift cylinder 8e. A front end portion of the lift arm 8a is supported by a rear upper portion of a case (transmission case) that houses the transmission 5 so as to be swingable upward or downward. The lift arm 8a is swung (raised or lowered) by driving of the lift cylinder 8e. The lift cylinder 8e includes a hydraulic cylinder. The lift cylinder 8e is connected to a hydraulic pump via a control valve 36. The control valve 36 is a solenoid valve or the like, and extends or contracts the lift cylinder 8e.

A front end portion of the lower link 8b is supported by a rear lower portion of the transmission 5 so as to be swingable upward or downward. A front end portion of the top link 8c is supported by a rear portion of the transmission 5, at a position above the lower link 8b so as to be swingable upward or downward. The lift rod 8d couples the lift arm 8a and the lower link 8b. The working implement 2 is coupled to a rear portion of the lower link 8b and a rear portion of the top link 8c. When the lift cylinder 8e is driven (extended or contracted), the lift arm 8a is raised or lowered, and the lower link 8b coupled to the lift arm 8a via the lift rod 8d is raised or lowered. Consequently, the working implement 2 swings upward or downward (is raised or lowered) with a front portion of the lower link 8b as a fulcrum.

As illustrated in FIG. 1 and FIG. 2, the tractor 1 includes a position detector 30. The position detector 30 is mounted forward of the roof 9b of the protector 9 via a mount 31. However, the mount position of the position detector 30 is not limited to the illustrated position, and the position detector 30 may be mounted on the roof 9b of the protector 9, or may be mounted at another position of the vehicle body 3. Also, the position detector 30 may be mounted on the working implement 2 such as the above-described cultivator.

The position detector 30 is a device that detects the position (measured position information including latitude and longitude) of the position detector 30 by a satellite positioning system. That is, the position detector 30 receives signals (positions of positioning satellites, transmission times, correction information, and so forth) transmitted from the positioning satellites and detects a position (latitude and longitude) based on the received signals. The position detector 30 may detect a position corrected based on a signal of correction or the like from a base station (reference station) capable of receiving signals from the positioning satellites as the position (latitude and longitude) of the position detector 30. Alternatively, the position detector 30 may include an inertial measurement unit such as a gyroscope sensor or an acceleration sensor, and may detect a position corrected by the inertial measurement unit as the position of the position detector 30. The position detector 30 can detect the position (travel position) of the vehicle body 3 of the tractor 1.

As illustrated in FIG. 1, the tractor 1 includes a plurality of obstacle detectors 45. Each of the plurality of obstacle detectors 45 can detect an object, that is, an obstacle present in a surrounding area of the tractor 1. At least one of the plurality of obstacle detectors 45 is provided at a position that is located forward of the protector 9 and outside the hood 25. That is, the at least one obstacle detector 45 is disposed in a region on the left of the left sidewall 25L of the hood 25 or in a region on the right of the right sidewall 25R of the hood 25 in a region located forward of the protector 9 of the tractor 1. In the case of the present preferred embodiment, the plurality of obstacle detectors 45 include an obstacle detector 45L provided on the left of the vehicle body 3 (the left of the hood 25) and an obstacle detector 45R provided on the right of the vehicle body 3 (the right of the hood 25).

The obstacle detectors 45 each are a laser scanner 45A, a sonar 45B, or the like. The laser scanner 45A detects an object (obstacle) by emitting a laser beam as a detection wave. The laser scanner 45A detects the distance to the obstacle based on the time from irradiation with the laser beam to reception of the laser beam. The sonar 45B detects an object (obstacle) by emitting a sound wave as a detection wave. Alternatively, the plurality of obstacle detectors 45 of the above-described preferred embodiment do not have to be provided outside the hood 25, and the arrangement or the like of the plurality of obstacle detectors 45 is not limited.

Figure 4:
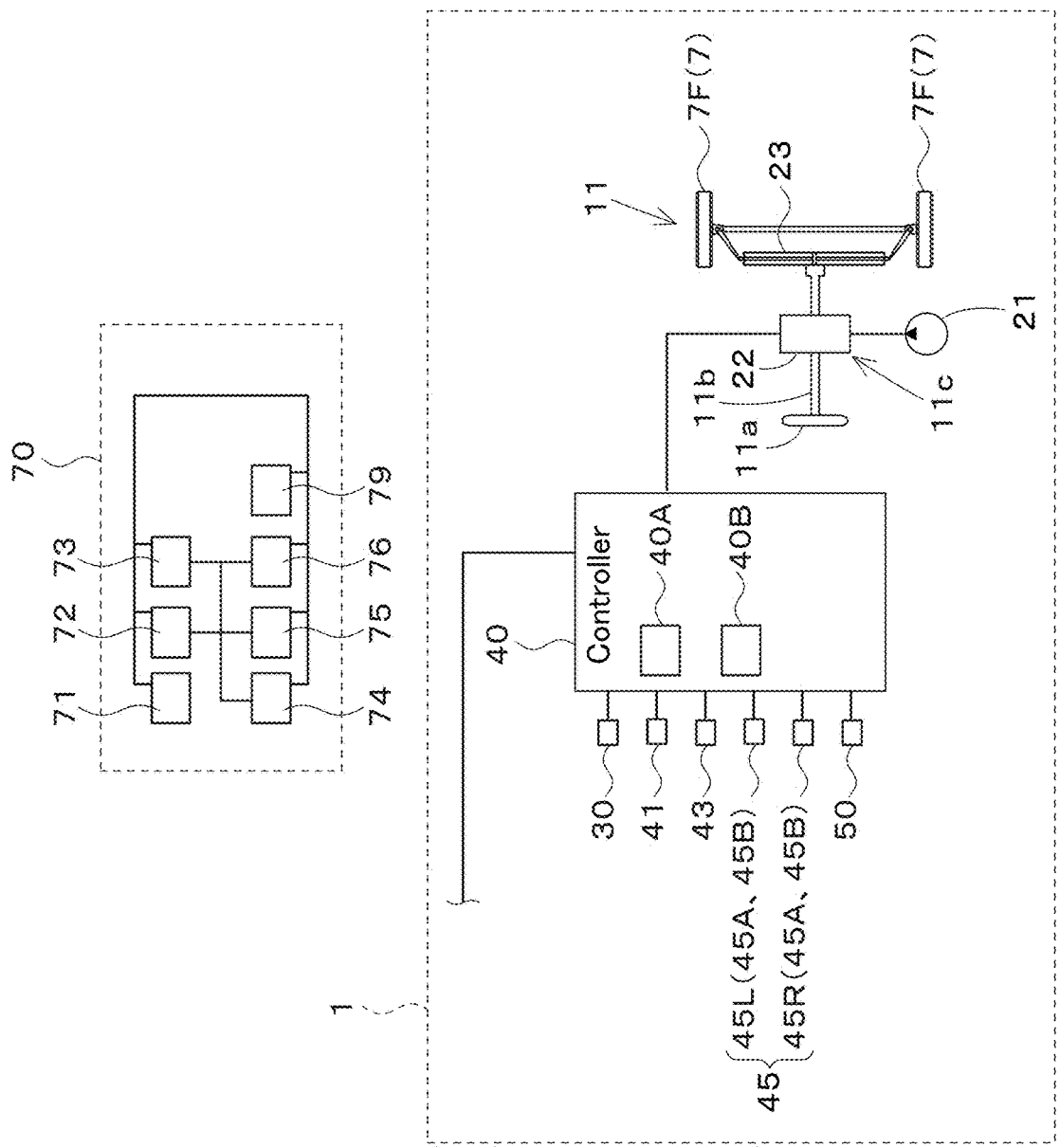
FIG. 4 is a control block diagram.

As illustrated in FIG. 4, the tractor 1 includes a steering device 11. The steering device 11 includes a handle (steering wheel) 11a, a rotation shaft (steering shaft) 11b that rotates with rotation of the handle 11a, and an assist mechanism (power steering mechanism) 11c that assists steering of the handle 11a. The assist mechanism 11c includes a hydraulic pump 21, a control valve 22 to which a hydraulic fluid delivered from the hydraulic pump 21 is supplied, and a steering cylinder 23 that is actuated by the control valve 22. The control valve 22 is a solenoid valve that is actuated based on a control signal. The control valve 22 is, for example, a three-position switching valve that can be switched by movement of a spool or the like. The control valve 22 can be also switched by steering of the steering shaft 11b. The steering cylinder 23 is connected to arms (knuckle arms) that change the direction of the front wheel 7F.

Thus, when the handle 11a is operated, the switching position and the opening of the control valve 22 are switched in accordance with the handle 11a, and the steering cylinder 23 is extended or contracted to the left or the right in accordance with the switching position and the opening of the control valve 22. Hence, the steering direction of the front wheel 7F can be changed. The above-described steering device 11 is an example, and the configuration of the steering device 11 is not limited to the above-described configuration.

As illustrated in FIG. 4, the tractor 1 includes a controller 40, a display 50, and a communication device 51 (communicator). The controller 40 includes a CPU, an electric circuit, an electronic circuit, or the like, and performs various types of control of the tractor 1. The display 50 includes a liquid crystal panel, an organic EL panel, or the like, and displays various items of information. The communication device 51 is a device that communicates with an external device. The communication device 51 is a communication module (communicator) that performs one of direct communication and indirect communication with an external device. For example, the communication device 51 can perform wireless communication according to a communication standard, such as IEEE802.11 series Wireless Fidelity (Wi-Fi, registered trademark), Bluetooth (registered trademark) Low Energy (BLE), Low Power, Wide Area (LPWA), or Low-Power Wide-Area Network (LPWAN). Alternatively, the communication device 51 may be a communication module (communicator) that performs wireless communication through a mobile phone communication network, a data communication network, or the like.

A state detector 41 that detects a driving state or the like of the tractor 1 is connected to the controller 40.

The state detector 41 is, for example, a device that detects a state of a traveling system, and detects the state of, for example, a crank sensor, a cam sensor, an engine rotation sensor, an accelerator sensor, a vehicle speed sensor, a steering angle sensor, or the position detector 30. The state detector 41 also includes a device that detects a state other than the state of the traveling system, for example, a raising/lowering operation detection sensor that detects an operation direction, an operation amount, or the like, of a raising/lowering operation member, or a PTO rotation detection sensor.

As illustrated in FIG. 4, the controller 40 controls a traveling system and a working system in the tractor 1. The controller 40 includes a traveling controller 40A and a raising/lowering controller 40B. The traveling controller 40A and the raising/lowering controller 40B include an electric/electronic circuit provided in the controller 40, a program stored in the controller 40, and so forth.

Figure 6A:
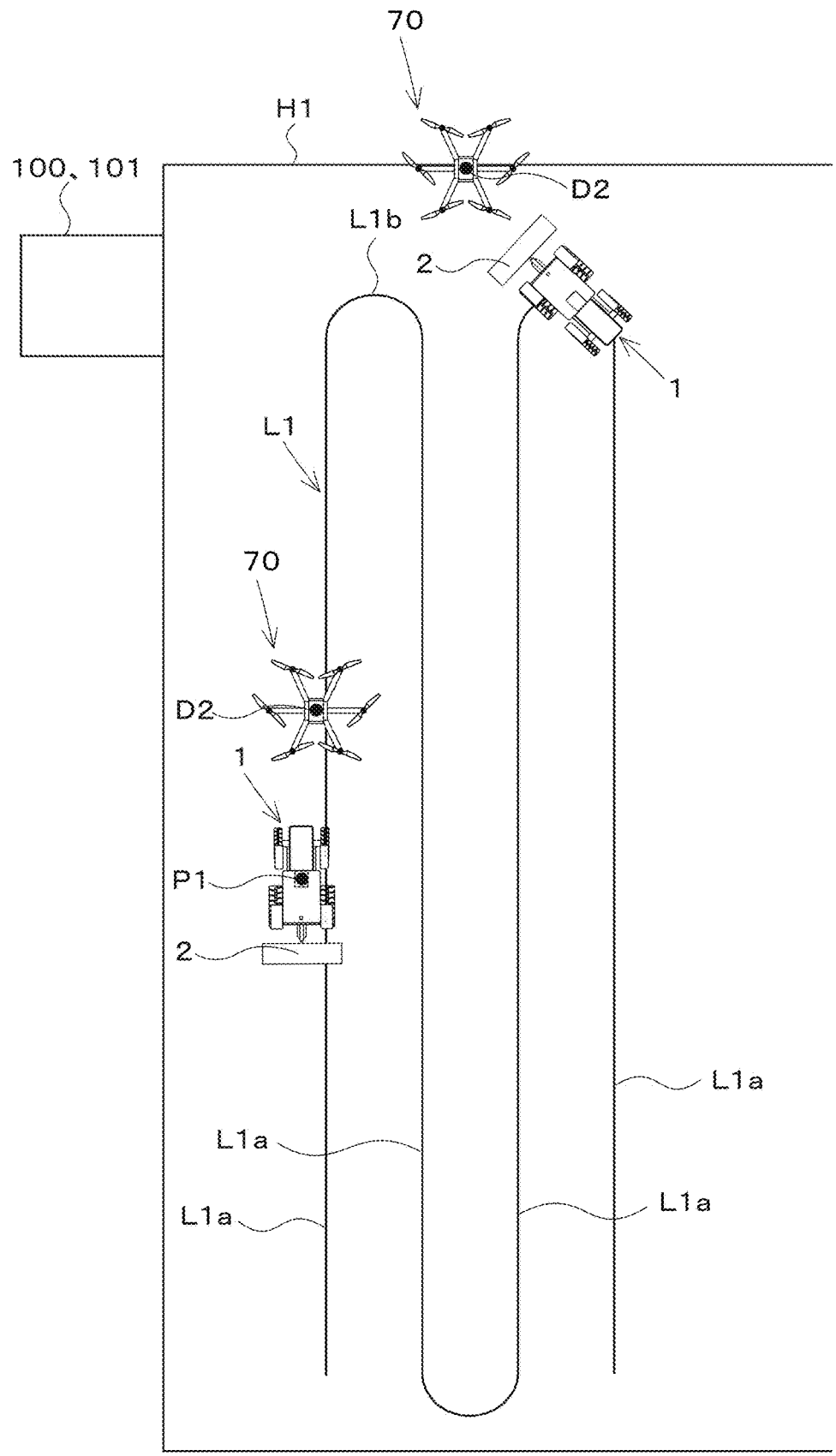
FIG. 6A is an explanatory diagram for explaining automatic traveling.

As illustrated in FIG. 6A, the traveling controller 40A performs automatic traveling control. In the automatic traveling control, the traveling controller 40A sets the switching position and the opening of the control valve 22 so that at least a travel position (the position detected by the position detector 30) P1 of the vehicle body 3 matches a preset planned travel line (travel path) L1. In other words, the controller 40 sets a moving direction and a moving amount of the steering cylinder 23 (a steering direction and a steering angle of the front wheel 7F) so that the travel position P1 of the tractor 1 matches the planned travel line.

Specifically, the traveling controller 40A compares the travel position P1 of the vehicle body 3 with the planned travel line L1, and when the travel position P1 matches the planned travel position, the traveling controller 40A maintains the steering angle and the steering direction of the handle 11a in the steering device 11 (the steering angle and the steering direction of the front wheel 7F) without changing the steering angle and the steering direction (maintains the opening and the switching position of the control valve 22 without changing the opening and the switching position). When the travel position P1 does not match the planned travel line L1, the traveling controller 40A changes the steering angle and/or the steering direction of the handle 11a in the steering device 11 (changes the opening and/or the switching position of the control valve 22) so that the deviation (dislocation amount) between the travel position P1 and the planned travel line L1 becomes zero.

In the above-described preferred embodiment, the traveling controller 40A changes the steering angle of the steering device 11 based on the deviation between the travel position and the planned travel line L1 in the automatic traveling control. However, when the orientation of the planned travel line is different from the orientation (vehicle body orientation) of a direction of travel (traveling direction) of the tractor 1 (vehicle body 3), the traveling controller 40A may set the steering angle so that the vehicle body orientation matches the orientation of the planned travel line. Alternatively, in the automatic traveling control, the traveling controller 40A may set a final steering angle in the automatic traveling control based on the steering angle obtained based on the deviation (position deviation) and the steering angle obtained based on the orientation deviation. Still alternatively, the steering angle may be set by a method different from the method of setting the steering angle in the above-described automatic traveling control.

In the automatic traveling control, the traveling controller 40A may control the traveling device 7, that is, the rotational speed of the front wheel 7F and/or the rear wheel 7R so that the actual vehicle speed of the tractor 1 (vehicle body 3) matches the vehicle speed corresponding to the preset planned travel line.

Also, the traveling controller 40A controls the automatic traveling based on the detection result of an obstacle by the obstacle detector 45. For example, the automatic traveling is continuously performed when the obstacle detector 45 does not detect an obstacle, and the automatic traveling is stopped when the obstacle detector 45 detects an obstacle. More specifically, when the obstacle detector 45 detects an obstacle, and when the distance between the obstacle and the tractor 1 is a predetermined threshold (stop threshold) or less, the traveling controller 40A stops the automatic traveling by stopping traveling of the tractor 1.

In the above-described preferred embodiment, when the distance between the obstacle and the tractor 1 is the predetermined threshold (stop threshold) or less, the traveling controller 40A stops the traveling of the tractor 1 in the automatic traveling. However, the traveling controller 40A may avoid the obstacle or may reduce the speed of the tractor 1 to travel at a low speed.

Also, a seating detector 43 is connected to the controller 40. The seating detector is, for example, a device or the like that detects the presence or absence of a driver (operator) seated on the operator's seat 10, and includes, for example, a pressure sensor. The traveling controller 40A continues the automatic traveling when the seating detector 43 detects seating of the operator during the automatic traveling. In contrast, the traveling controller 40A stops the automatic traveling when the seating detector 43 does not detect seating of the operator during the automatic traveling.

The raising/lowering controller 40B performs raising/lowering control. When a manual raising/lowering function is enabled, and when the raising/lowering operation member is operated in a raising direction (upward), the raising/lowering controller 40B controls a control valve 34 to extend the lift cylinder 8e and raise a rear end portion (an end portion near the working implement 2) of the lift arm 8a. In the raising/lowering control, when the manual raising/lowering function is enabled, and when the raising/lowering operation member is operated in a lowering direction (downward), the control valve 34 is controlled to contract the lift cylinder 8e and lower the rear end portion (the end portion near the working implement 2) of the lift arm 8a. When the working implement 2 is raised by the coupler (raising/lowering device) 8, and when the position of the working implement 2, that is, the angle of the lift arm 8a reaches an upper limit (height upper limit value) set by a height setting dial, the raising operation in the coupler (raising/lowering device) 8 is stopped.

In the raising/lowering control, when a backup function is enabled, and when the vehicle body 3 travels backward, the control valve 34 is automatically controlled to extend the lift cylinder 8e, and the rear end portion (the end portion near the working implement 2) of the lift arm 8a is raised. In the raising/lowering control, when an auto-up function is enabled, and when the steering angle of the steering device 11 becomes a predetermined angle or more, the control valve 34 is automatically controlled to extend the lift cylinder 8e and raise the rear end portion (the end portion near the working implement 2) of the lift arm 8a.

FIG. 4 illustrates an agricultural support system in which an unmanned aerial vehicle 70 changes its flight position in tandem with the tractor 1. The unmanned aerial vehicle 70 is, for example, a multicopter.

Hereinafter, the unmanned aerial vehicle 70 will be described using a multicopter as an example.

As illustrated in FIG. 1 and FIG. 2, the unmanned aerial vehicle (multicopter) 70 includes a main body 70a, a plurality of arms 70b provided at the main body 70a, a plurality of rotor blades 70c provided on the arms 70b, and a skid 70d provided on the main body 70a. The plurality of rotor blades 70c each are a device that generates a lift for flight. The unmanned aerial vehicle 70 is provided with at least two or more, or preferably four or more rotor blades 70c. Each of the plurality of rotor blades 70c includes a rotor that applies a rotational force and a blade (propeller) that rotates by driving of the rotor.

Figure 5A:
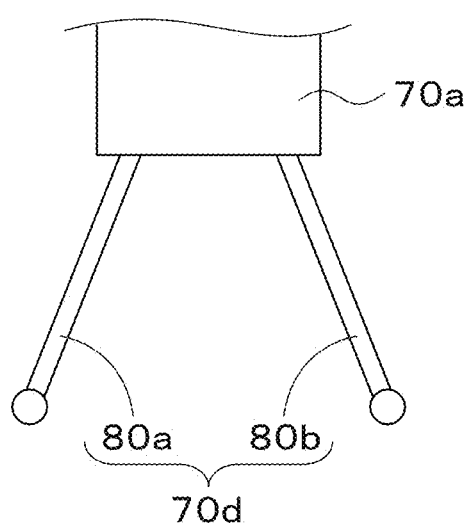
FIG. 5A illustrates a skid of an unmanned aerial vehicle.
Figure 5B:
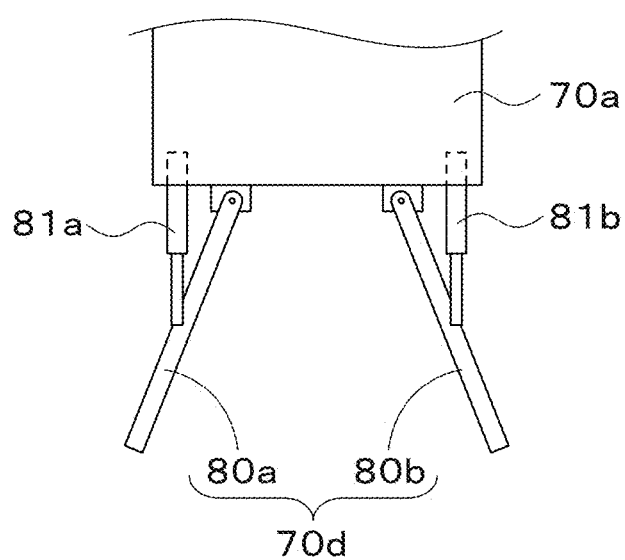
FIG. 5B illustrates a skid different from that illustrated in FIG. 5A.
Figure 5C:
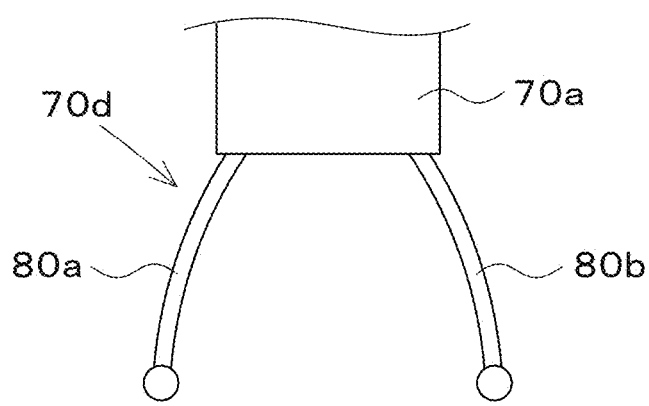
FIG. 5C illustrates a skid different from those illustrated in FIGS. 5A and 5B.

FIGS. 5A to 5C illustrate examples of skids 70d. In this preferred embodiment, the unmanned aerial vehicle 70 includes one of the skids 70d illustrated in FIGS. 5A to 5C, but the structure of the skid 70d is not limited to the structures illustrated in FIGS. 5A to 5C.

As illustrated in FIG. 5A, the skid 70d includes a plurality of legs 80a and 80b. Proximal end portions of the plurality of legs 80a and 80b are fixed to the main body 70a, and distal end portions of the legs 80a and 80b are free ends. The plurality of legs 80a and 80b are made of metal or the like and are not deformable. Each of the plurality of legs 80a and 80b gradually shifts outward as it extends away from the main body 70a, and the legs 80a and 80b form an inverted V shape.

FIG. 5B illustrates a skid 70d different from the skid 70d illustrated in FIG. 5A. As illustrated in FIG. 5B, the skid 70d includes a plurality of legs 80a and 80b and a plurality of actuators 81a and 81b.

Proximal end portions of the plurality of legs 80a and 80b are swingably attached to a main body 70a, and distal end portions of the legs 80a and 80b are free ends.

The actuators 81a and 81b are devices that swing the plurality of legs 80a and 80b, and include, for example, cylinders that can be extended or contracted by electric power or the like. A proximal end portion of the actuator 81a is fixed to the main body 70a, and a distal end portion of the actuator 81a is coupled to the leg 80a. A proximal end portion of the actuator 81b is fixed to the main body 70a, and a distal end portion of the actuator 81b is coupled to the leg 80b.

Thus, when the actuator 81a is extended or contracted, the leg 80a is swung by the extension or contraction of the actuator 81a with the proximal end portion serving as a swing fulcrum. Also, when the actuator 81b is extended or contracted, the leg 80b is swung by the extension or contraction of the actuator 81b with the proximal end portion serving as a swing fulcrums.

FIG. 5C illustrates a skid 70d different from the skids 70d illustrated in FIGS. 5A and 5B. The skid 70d includes a plurality of legs 80a and 80b. Proximal end portions of the plurality of legs 80a and 80b are fixed to the main body 70a, and distal end portions of the legs 80a and 80b are free ends. The plurality of legs 80a and 80b are made of metal, resin, or the like, and are deformable. Each of the plurality of legs 80*a* and 80*b* is different from those illustrated in FIGS. 5A and 5B, and gradually shifts outward as it extends away from the main body 70*a*, and then shifts inward as it extends from a middle portion to a distal end portion. The legs 80*a* and 80*b* form an arc shape.

As illustrated in FIG. 4, the unmanned aerial vehicle 70 includes a power storage 71, a sensor 72, a position detector 73, a memory 74, a communication device 75, and a controller 76. The power storage 71 is a battery, a capacitor, or the like, and stores electric power. The power storage 71 is attached to, for example, the inside of the main body 70*a* or the main body 70*a*.

The sensor 72 includes a CCD camera, an infrared camera, or the like, and is detachably provided at a lower portion of the main body 70*a*, or is provided at the main body 70*a* via a bracket (not illustrated). The sensor 72 is swingable in a vertical direction or a horizontal direction with respect to the bracket so that a sensing direction can be changed. The swing of the sensor 72 in the horizontal direction or the vertical direction can be controlled by the controller 76. For example, when the unmanned aerial vehicle 70 is controlled by a remote controller, and when the controller 76 acquires a control signal transmitted from the remote controller via the communication device 75, the controller 76 causes the sensor 72 to swing in the horizontal direction or the vertical direction in accordance with the acquired control signal.

When the unmanned aerial vehicle 70 flies above an agricultural field, the sensor 72 can sense the agricultural field. When the sensor 72 is a CCD camera, for example, several tens to several hundreds of fragment images of the agricultural field are captured by aerial imaging of the agricultural field from a height of about 100 m above the agricultural field. The plurality of images captured by aerial imaging, that is, the plurality of images (aerial images) captured by the sensor 72 are stored in the memory 74 provided in the unmanned aerial vehicle 70. The plurality of aerial images stored in the memory 74 of the unmanned aerial vehicle 70 can be output to an external device by the communication device 75.

Similarly to the position detector 30, the position detector 73 is a device that detects the position (measured position information including latitude and longitude) of the position detector 73 by a satellite positioning system, and has a configuration similar to the position detector 30. The position of the position detector 73 detected by the position detector 73 may be referred to as a "flight position". The position detector 73 can also detect height information, that is, altitude.

The communication device 75 is a communication module (communicator) that performs one of direct communication and indirect communication with an external device. For example, the communication device 75 can perform wireless communication according to a communication standard, such as IEEE802.11 series Wireless Fidelity (Wi-Fi, registered trademark), Bluetooth (registered trademark) Low Energy (BLE), Low Power, Wide Area (LPWA), or Low-Power Wide-Area Network (LPWAN). Alternatively, the communication device 75 may be a communication module (communicator) that performs wireless communication through a mobile phone communication network, a data communication network, or the like.

The controller 76 is a device that controls the plurality of rotor blades 70*c*. The controller 76 includes, for example, a CPU. When the unmanned aerial vehicle 70 includes at least two rotor blades 70*c*, the controller 76 outputs control signals to the rotors to make the rotational speed of one blade lower than the rotational speed of the other blade, thus causing the unmanned aerial vehicle to advance toward the one blade, or to make the rotational speed of the other blade lower than the rotational speed of the one blade, thus causing the unmanned aerial vehicle to advance toward the other blade. That is, the controller 76 controls the direction of travel of the unmanned aerial vehicle 70 by making the rotational speed of a blade in the direction of travel of the plurality of blades lower than the rotational speed of a blade in a direction opposite to the direction of travel. Also, the controller 76 causes the unmanned aerial vehicle 70 to hover by making the rotational speed of the plurality of blades constant.

The unmanned aerial vehicle 70 may be an aerial vehicle that is controlled by a remote controller or an aerial vehicle that flies autonomously, and is not limited thereto.

The unmanned aerial vehicle 70 is an aerial vehicle that flies in tandem with the tractor 1. For example, when the tractor 1 is performing work with the working implement 2 while traveling in an agricultural field, the unmanned aerial vehicle 70 flies while the sensor 72 senses a surrounding area of the tractor 1, the tractor 1, and the working implement 2.

The controller 76 of the unmanned aerial vehicle 70 changes the flight position of the unmanned aerial vehicle 70 in tandem with an operation of the tractor 1. The unmanned aerial vehicle 70 flies from a predetermined takeoff location 100 (see FIG. 6A) to an agricultural field H1 where the tractor 1 is working, for example, before the tractor 1 starts automatic traveling. When the automatic traveling of the tractor 1 is started and the tractor 1 starts working, the unmanned aerial vehicle 70 flies in a surrounding area of the tractor 1, a surrounding area the working implement 2, or the like.

For example, as illustrated in FIG. 6A, when the tractor 1 is performing ground work with the working implement 2 while traveling on a straight portion L1*a* of a planned travel line L1, that is, when the coupler (raising/lowering device) 8 is lowered and ground work such as cultivation is performed on an agricultural field with the working implement 2, as illustrated in FIG. 6A and FIG. 7A, the unmanned aerial vehicle 70 flies forward of the tractor 1 in the direction of travel and senses a portion of the surrounding area in the direction of travel of the tractor 1 at a flight position D2 located forward of the tractor 1. That is, the sensor 72 performs sensing in the direction of travel while the tractor 1 is automatically traveling and performing work (during work). That is, the controller 76 of the unmanned aerial vehicle 70 changes the flight position to a position that allows an area forward of the vehicle body 3 in the direction of travel to be sensed when the working implement 2 performs the ground work.

Figure 7B:
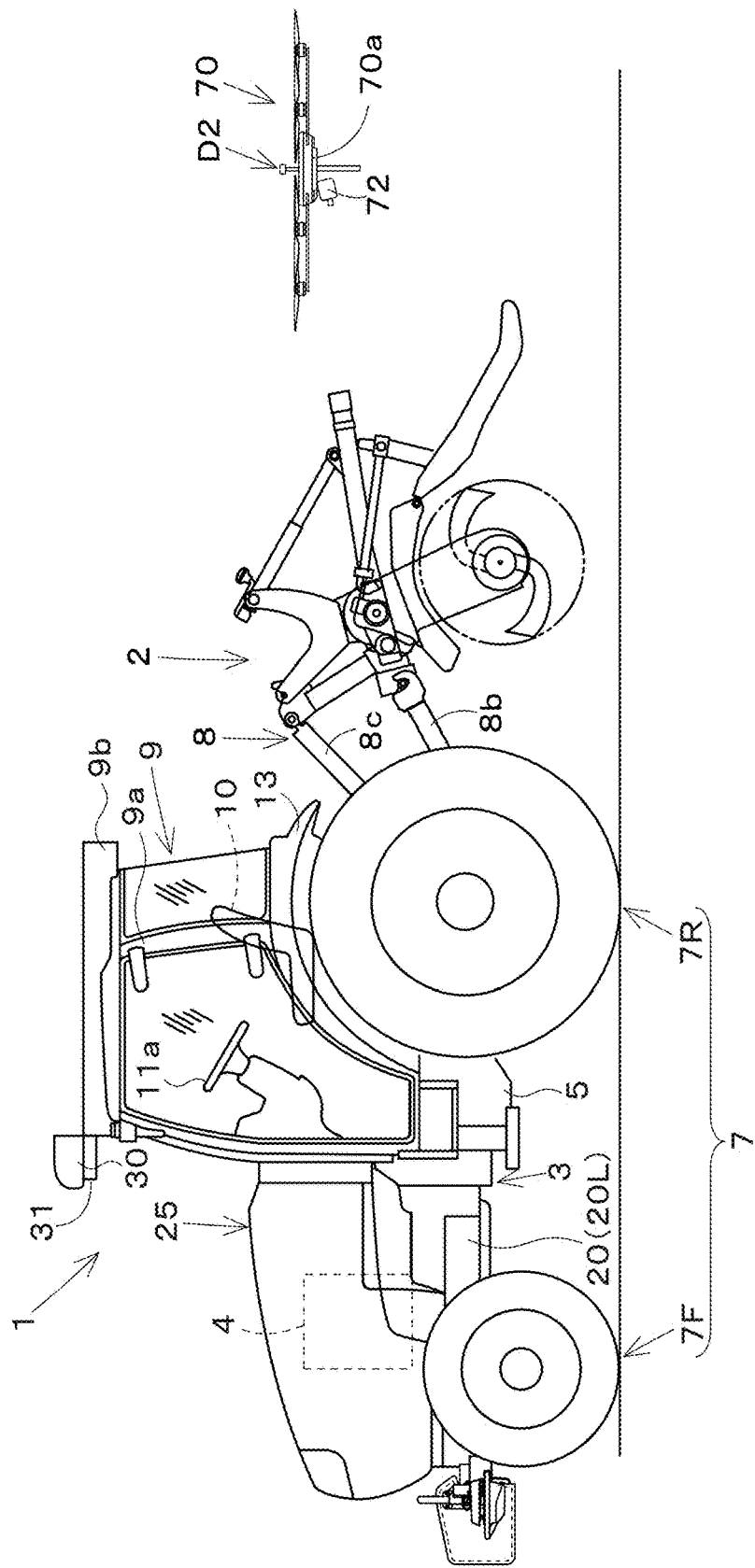
FIG. 7B is a side view illustrating the unmanned aerial vehicle flying rearward of a working implement.

In contrast, when the tractor 1 is traveling on a turning portion L1*b* of the planned travel line L1, that is, when the coupler (raising/lowering device) 8 is raised and the ground work such as cultivation is not performed with the working implement 2, as illustrated in FIG. 6A and FIG. 7B, the unmanned aerial vehicle 70 moves from the front of the tractor 1 to the rear of the working implement 2 and senses a surrounding area of the working implement 2 at a flight position D2 located rearward of the working implement 2.

When the tractor 1 is stopped, for example, when the tractor 1 is stopped at a work start point P2 before start of work, or when the tractor 1 is stopped in the agricultural field H1 for some reason, the unmanned aerial vehicle 70 changes the flight position to a position at which the surrounding area of the tractor 1 can be sensed.

Figure 8:
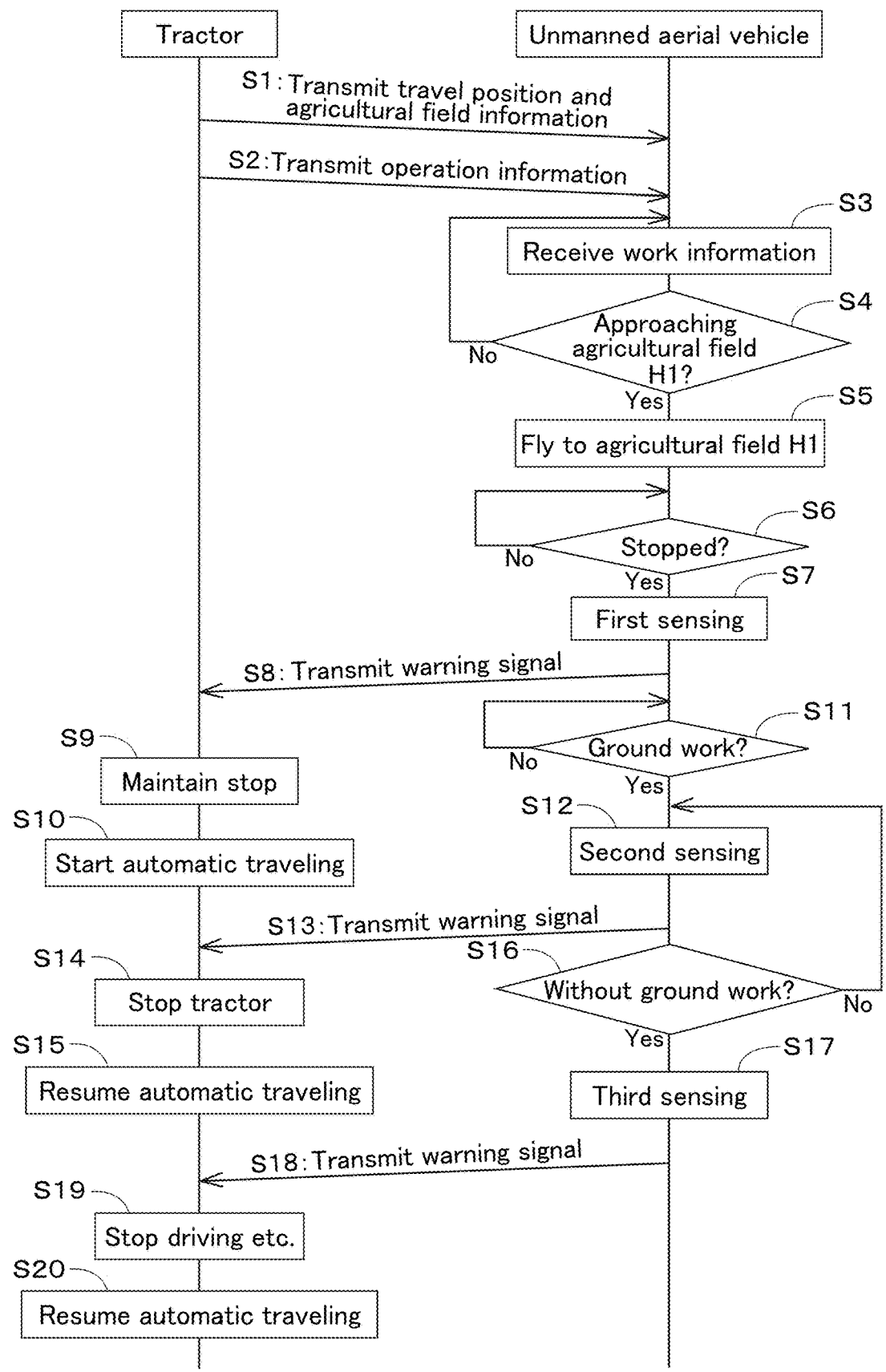
FIG. 8 is a flowchart presenting an operation in which the unmanned aerial vehicle flies in cooperation (association) with the tractor.

FIG. 8 is a flowchart presenting an operation in which the unmanned aerial vehicle flies in cooperation (association) with the tractor.

As presented in FIG. 8, when the tractor 1 is driven, the communication device 51 of the tractor 1 transmits the travel position P1 detected by the position detector 30 and agricultural field information including the position of the agricultural field H1 where the work of the tractor 1 is to be performed, to the unmanned aerial vehicle 70 (S1). In addition, the communication device 51 of the tractor 1 transmits operation information, such as the vehicle speed of the tractor 1 and whether the coupler (raising/lowering device) 8 is raised or lowered, to the unmanned aerial vehicle 70 (S2). That is, the tractor 1 transmits work information related to the work of the tractor 1, such as the travel position P1, the agricultural field information, and the operation information, to the unmanned aerial vehicle 70.

In contrast, when the communication device 75 of the unmanned aerial vehicle 70 receives the work information (the travel position P1, the agricultural field information, and the operation information) transmitted from the tractor 1 (S3), the communication device 75 determines an operation such as flight based on the work information. For example, when the controller 76 refers to the work information and determines from the work information that the travel position P1 is approaching the agricultural field H1 where the work is to be performed (S4, Yes), the controller 76 controls the rotor blades 70c to cause the unmanned aerial vehicle 70 to take off from the takeoff location 100 and then fly to the agricultural field H1 where the work of the tractor 1 is to be performed (S5).

The controller 76 refers to the work information, and when it is determined from the work information that the tractor 1 has stopped for a predetermined time or more (S6, Yes), the controller 76 performs control of sensing a surrounding area of the tractor 1 (a range several meters away from the tractor 1) by the unmanned aerial vehicle 70 (S7: first sensing). In the first sensing, the sensor 72 is directed toward the tractor 1 to capture an image of the range several meters away from the tractor 1, thus monitoring whether a living body M1 such as an animal or a human is present in the range. When the living body M1 is detected in the first sensing, the communication device 75 transmits to the communication device 51 (S8) a warning signal, which may hereinafter be referred to simply as an "instruction". When acquiring the warning signal via the communication device 51, the traveling controller 40A of the tractor 1 does not start the automatic traveling and maintains the stop (S9). The traveling controller 40A of the tractor 1 starts the automatic traveling when the warning signal is not acquired for a predetermined time or more, or when a release signal for releasing the warning is received from the unmanned aerial vehicle 70 (S10).

The controller 76 refers to the work information, and when it is determined from the work information that the tractor 1 is traveling while performing ground work (S11, Yes), the controller 76 sets the flight position of the unmanned aerial vehicle 70 to the front of the tractor 1 and performs control to sense the front of the tractor 1 (S12: second sensing).

In the second sensing, as illustrated in FIG. 7A, the sensor 72 is directed toward the front of the tractor 1 to capture an image of an area located forward of the tractor 1 and monitor whether a living body M1, an obstacle, or the like, is present forward of the tractor 1. When the living body M1 or the obstacle is detected in the second sensing, the communication device 75 transmits a warning signal to the communication device 51 (S13). When acquiring the warning signal via the communication device 51, the traveling controller 40A of the tractor 1 stops the automatic traveling and stops the tractor 1 (S14). The traveling controller 40A of the tractor 1 resumes the automatic traveling when the warning signal is not acquired for a predetermined time or more, or when a release signal for releasing the warning is received from the unmanned aerial vehicle 70 (S15).

The controller 76 refers to the work information, and when it is determined from the work information that the tractor 1 is traveling without performing ground work (S16, Yes), the controller 76 sets the flight position of the unmanned aerial vehicle 70 to the rear of the working implement 2 and performs control to sense the working implement 2 (S17: third sensing).

In the third sensing, as illustrated in FIG. 7B, the sensor 72 is directed toward the working implement 2 to capture an image of the surrounding area of the working implement 2, thus monitoring whether a living body M1 or an obstacle M2 is present in the surrounding area. When the living body M1 or the obstacle M2 is detected in the third sensing, the communication device 75 transmits a warning signal to the communication device 51 (S18). When acquiring the warning signal via the communication device 51, the controller 40 of the tractor 1 stops driving the PTO shaft or the like or stops the tractor 1 (S19). The controller 40 of the tractor 1 resumes the driving of the PTO shaft or the automatic traveling when the warning signal is not acquired for a predetermined time or more, or when a release signal for releasing the warning is received from the unmanned aerial vehicle 70 (S20).

As described above, since the unmanned aerial vehicle 70 flies in tandem with the tractor 1, the tractor 1 can smoothly perform work when the tractor 1 performs the work while the tractor 1 automatically travels. That is, a blind spot of the tractor 1 or the working implement 2 can be compensated by the sensing of the unmanned aerial vehicle 70, and workability can be improved.

Figure 9A:
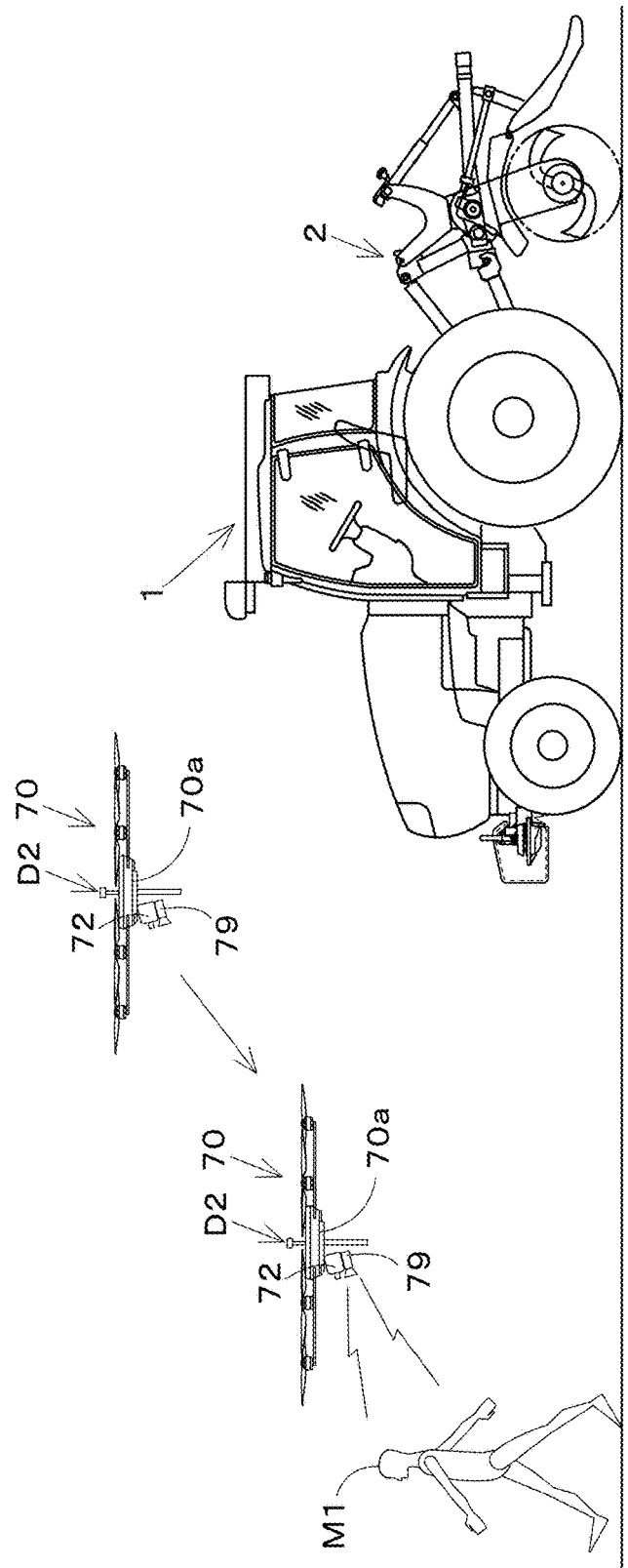
FIG. 9A illustrates a state in which a living body M1 is detected during forward traveling of the tractor.

In the above-described preferred embodiment, when the unmanned aerial vehicle 70 detects a living body M1 or an obstacle M2, the unmanned aerial vehicle 70 outputs the warning signal to the tractor 1. However, as illustrated in FIG. 4, FIG. 9A, and FIG. 9B, the unmanned aerial vehicle 70 may include a warner 79 (warning generator) that outputs (generates) a warning. The warner 79 is, for example, a lamp that generates a light source (light), or a speaker that generates voice, sound, or the like.

As illustrated in FIG. 9A, when the sensor 72 detects a living body M1 in a situation in which the tractor 1 is traveling and the sensor 72 is capturing an image of an area located forward of the tractor 1, that is, during the second sensing, the unmanned aerial vehicle 70 approaches the living body M1 and causes the warner 79 to generate a warning.

Alternatively, as illustrated in FIG. 9B, when the sensor 72 detects a living body M1 in a situation in which the tractor 1 is traveling and the sensor 72 captures an image of the working implement 2, that is, during the third sensing, the unmanned aerial vehicle 70 approaches the living body M1 and causes the warner 79 to generate a warning.

As described above, when the sensor 72 detects a living body M1 in a situation in which the tractor 1 is stopped and the sensor 72 is capturing an image of the working implement 2, that is, during the first sensing, the unmanned aerial vehicle 70 approaches the living body M1 and causes the warner 79 to generates a warning.

In the above-described preferred embodiment, in the working implement 2, the unmanned aerial vehicle 70 flies forward of the tractor 1 when the ground work is being performed. However, when the working implement 2 is a plow or the like, the unmanned aerial vehicle 70 may fly rearward of the tractor 1 during the ground work.

Although the flight position of the unmanned aerial vehicle 70 is changed in accordance with raising or lowering of the working implement 2, the flight position of the unmanned aerial vehicle 70 may be changed when the working implement 2 operates in the horizontal direction. As illustrated in FIG. 9C, for example, when the working implement 2 is a plow or the like, and when the working implement 2 is changed from the left of the direction of travel of the tractor 1 to the right of the direction of travel of the tractor 1 by turning at end of the agricultural field in a state in which the working implement 2 is cultivating the agricultural field, the unmanned aerial vehicle 70 also changes its flight position in the horizontal direction from the left of the direction of travel of the tractor 1 to the right of the direction of travel of the tractor 1.

When the sensor 72 of the unmanned aerial vehicle 70 detects a plurality of living bodies M1, the unmanned aerial vehicle 70 gives a warning preferentially to the living body M1 closest to the tractor 1 (vehicle body 3), or gives a warning preferentially to the living body M1 having the fastest moving speed of the living body M1 when the living body M1 is moving. Also, when the living body M1 is a human, an animal, or a bird, the unmanned aerial vehicle 70 preferentially warns the human.

An unmanned aerial vehicle 70 as described above includes a main body 70a, at least one arm 70b provided on the main body 70a, at least one rotor blade 70c provided on the at least one arm 70b, a sensor 72 to sense an agricultural machine (tractor 1) during flight in a surrounding area of the agricultural machine 1, a position detector 73 to detect a flight position that is a position of the position detector 73, and a controller 76 to change the flight position detected by the position detector 73 by controlling the at least one rotor blade 70c, wherein the controller 76 changes the flight position in tandem with an operation of the agricultural machine 1. With this, when the agricultural machine 1 performs work in an agricultural field, the unmanned aerial vehicle 70 can change the flight position in tandem with the operation of the agricultural machine 1, and hence monitoring can be performed according to the work done by the agricultural machine 1. That is, it is possible to improve accuracy of monitoring by the unmanned aerial vehicle 70 by changing the flight position in tandem with the operation of the agricultural machine 1.

The traveling vehicle body 3 may be configured to raise and lower the working implement 2. The unmanned aerial vehicle 70 may be operable to change the flight position toward the working implement 2 when the working implement 2 is raised or lowered or moves in a horizontal direction. For example, when the working implement 2 is raised or lowered, the controller 76 of the unmanned aerial vehicle 70 can sense the entire working implement 2 by causing the unmanned aerial vehicle 70 to fly in the surrounding area of the working implement 2, and when the working implement 2 is lowered from the raised position, the controller 76 can sense mainly the blind spot of the working implement 2 by setting the flight position of the unmanned aerial vehicle 70 below the working implement 2.

Alternatively, the traveling vehicle body 3 may be configured to raise and lower the working implement 2, and the unmanned aerial vehicle 70 may be operable to change the flight position of the unmanned aerial vehicle 70 when the working implement 2 moves in the horizontal direction. Thus, even though ground work performed by the working implement 2 changes, the ground work can be checked.

The agricultural machine 1 may include a traveling vehicle body 3 to raise and lower a working implement 2. The controller 76 may be operable to change the flight position to a position that allows the sensor 72 to sense an area forward of the traveling vehicle body 3 in a direction of travel when the working implement 2 performs ground work. With this, when the working implement 2 is performing ground work, it is possible to know the situation before the working implement 2 performs the work (before the work) by monitoring the area forward of the agricultural machine 1 in the direction of travel of the agricultural machine 1.

The controller 76 may be configured or programmed to change the flight position to a position that allows the surrounding area of the agricultural machine 1 to be sensed when the agricultural machine 1 is stopped. With this, the surrounding area can be monitored while the agricultural machine 1 is stopped.

The unmanned aerial vehicle 70 may further include a warner 79 (warning generator) to output a warning. The sensor 72 captures an image of the surrounding area of the agricultural machine 1 while the agricultural machine 1 is stopped or traveling. The warner 79 may be operable to output the warning when the sensor 72 detects a living body. With this, when it is detected that a living body such as an animal or a human is present in the vicinity of the agricultural machine 1, it is possible to keep the living body away from the agricultural machine 1 by outputting the warning.

The controller 76 may be configured or programmed to change the flight position to a surrounding area of the living body when the sensor 72 detects the living body. With this, the unmanned aerial vehicle 70 can approach the living body and give the warning.

The unmanned aerial vehicle 70 may include a communication device 75 to transmit stop of travel to the agricultural machine 1 when the sensor 72 detects the living body while the agricultural machine 1 is traveling. With this, the unmanned aerial vehicle 70 can stop the agricultural machine 1 upon detecting a living body while the agricultural machine 1 is traveling.

An agricultural support system includes an unmanned aerial vehicle 70 including a sensor 72, and an agricultural machine 1 including a traveling vehicle body 3 to which a working implement 2 is attachable. The unmanned aerial vehicle 70 changes a flight position with respect to the agricultural machine 1 in tandem with an operation of the agricultural machine 1.

With this, when the agricultural machine 1 performs work in an agricultural field, the unmanned aerial vehicle 70 can change the flight position in tandem with the operation of the agricultural machine 1, and hence monitoring can be performed according to the work done by the agricultural machine 1.

The agricultural support system may further include a warner 79 (warning generator) to output a warning. The sensor 72 may be operable to capture an image of a surrounding area of the agricultural machine 1 while the agricultural machine 1 is stopped or traveling. The warner 79 may be operable to output the warning when the sensor 72 detects a living body. With this, when it is detected that a living body such as an animal or a human is present in the agricultural machine 1, it is possible to keep the living body away from the agricultural machine 1 by outputting the warning.

In the above-described preferred embodiments, the situation in the direction of travel of the tractor 1 is sensed by the sensor 72 of the unmanned aerial vehicle 70 during the automatic traveling of the tractor 1. However, the obstacle detector 45 of the tractor 1 changes a detection area to detect an obstacle M2 based on the result sensed by the sensor 72 of the unmanned aerial vehicle 70.

Figure 10:
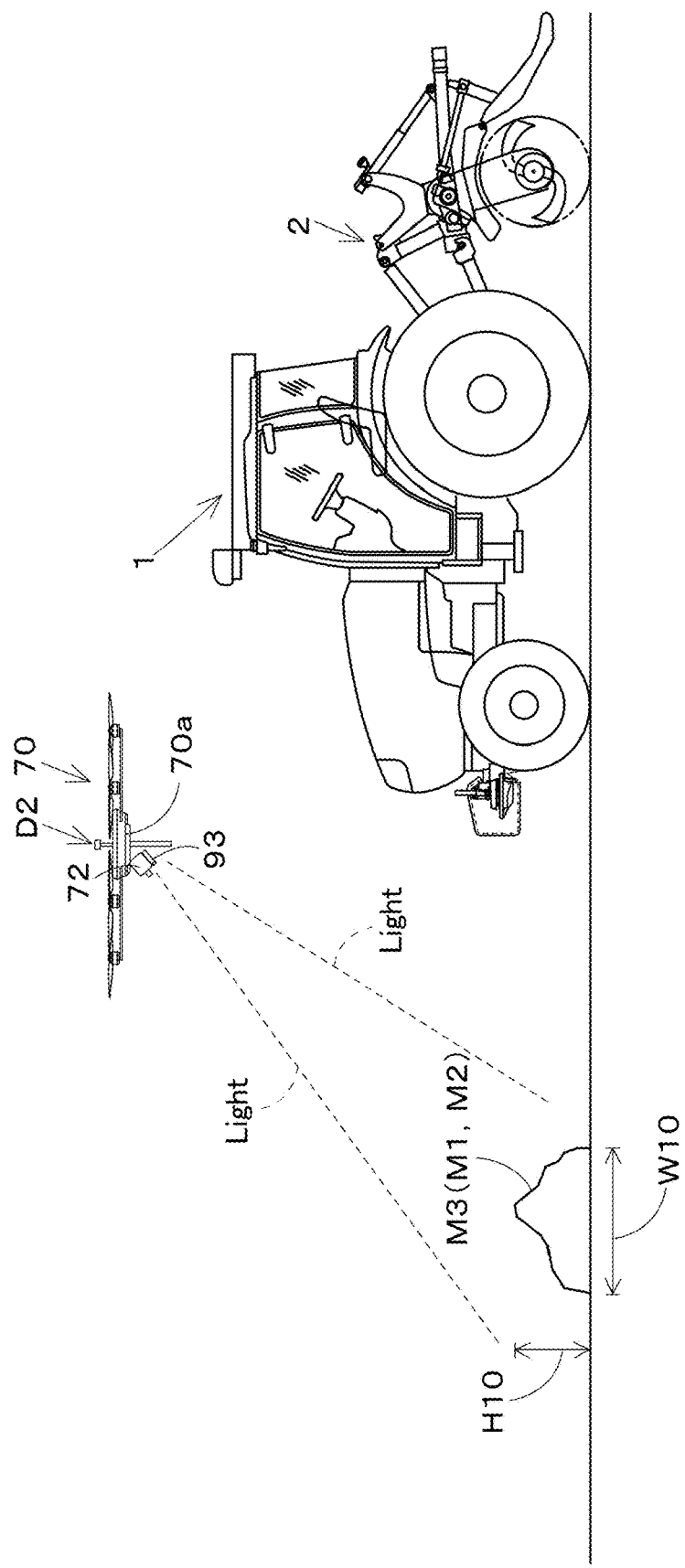
FIG. 10 is a side view illustrating a state in which an object M3 is detected during forward traveling of the tractor.
Figure 11A:
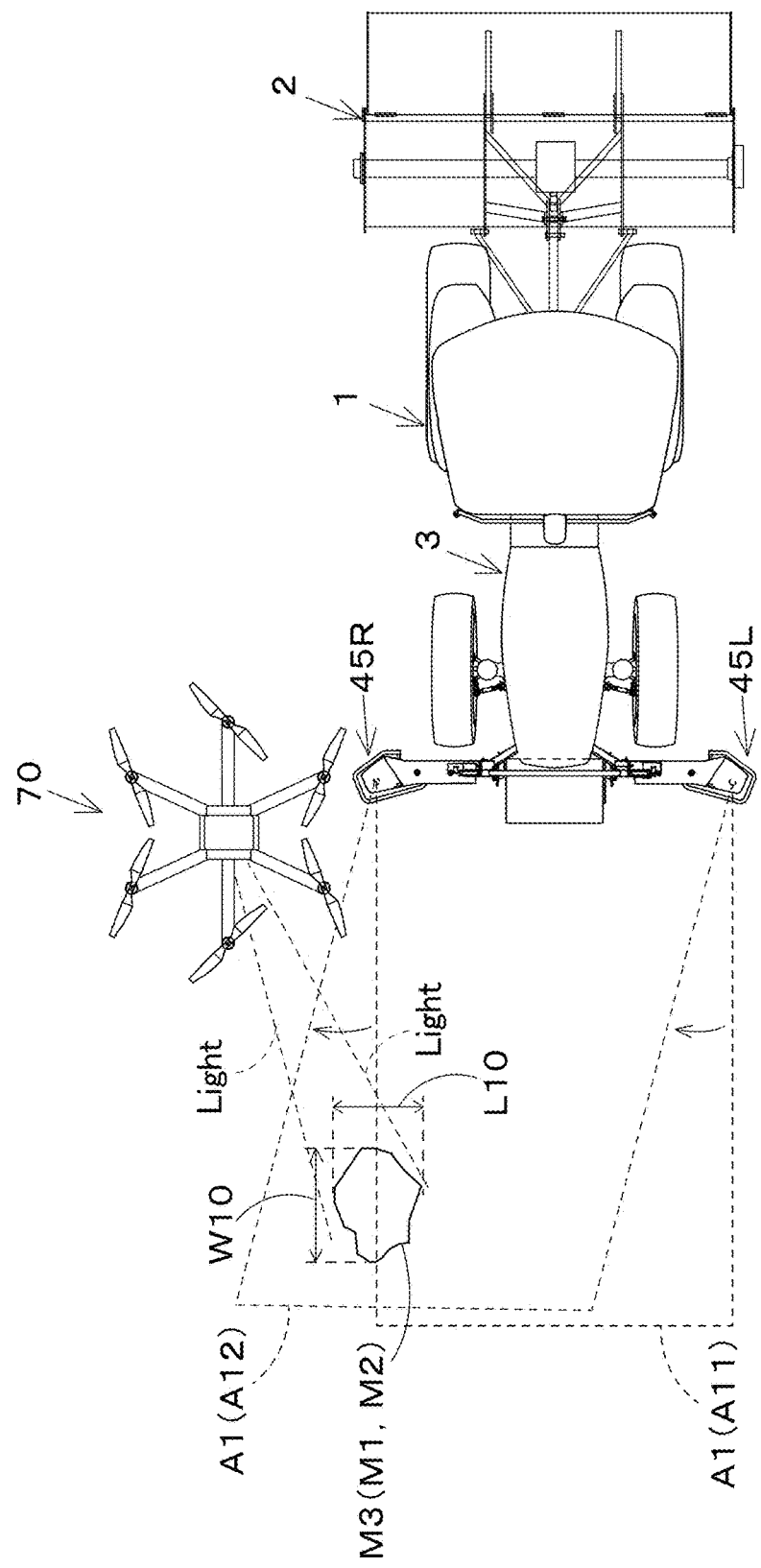
FIG. 11A is a top view illustrating the state in which the object M3 is detected during forward traveling of the tractor.

As illustrated in FIG. 10 and FIG. 11A, when the sensor 72 detects an object M3, such as a living body M1 or an obstacle M2, in a situation in which the tractor 1 is traveling and the sensor 72 is capturing an image of an area located forward of the tractor 1, the communication device 75 of the unmanned aerial vehicle 70 transmits, as the detection result, information indicating the detection of the object M3, for example, the size (height H10, width L10, depth W10) and the position of the object M3 to the tractor 1.

The obstacle detectors 45L and 45R change the detection area A1 based on the size (height H10, width L10, depth W10) and the position of the object M3. For example, in a case where the detection area A1 when the sensor 72 does not detect the object M3 is "A11", the obstacle detectors 45L and 45R change the detection area A1 when the sensor 72 detects the object M3 to "A12".

More specifically, the obstacle detectors 45L and 45R calculate an area in which the entire object M3 is included from the size (height H10, width L10, depth W10) and the position of the object M3, and set the calculated area as the detection area A12. That is, the detection area A12 when the sensor 72 detects the object M3 is set to an area in which the entire object M3 is included as compared with the detection area A11 when the sensor 72 does not detect the object M3.

As illustrated in FIG. 10, the unmanned aerial vehicle 70 may include an irradiator 93. The irradiator 93 is a lamp, a laser, or the like, that generates a light. When the size (height H10, width L10, and depth W10) of the object M3 detected by the sensor 72 is a predetermined value or more, for example, when each of the height H10, width L10, and depth W10 of the object M3 is a predetermined value or more, the irradiator 93 irradiates the object M3 with the light source. That is, the irradiator 93 is directed toward the object M3, and the irradiator 93 emits light.

When the object M3 is irradiated with the light source (light), the obstacle detectors 45L and 45R adjust the detection area A12 so that the light to the object M3 enters the detection area A12. That is, the obstacle detectors 45L and 45R cause the object M3 and the irradiation light from the irradiator 93 to enter the detection area A12.

In the above-described preferred embodiment, the irradiator 93 of the unmanned aerial vehicle 70 irradiates the object M3 with the light when the object M3 is detected. However, the irradiator 93 may emit a light source in the direction of travel of the tractor 1 in a state in which the object M3 is not detected, that is, in a state in which the unmanned aerial vehicle 70 is flying while following the tractor 1.

Figure 12:
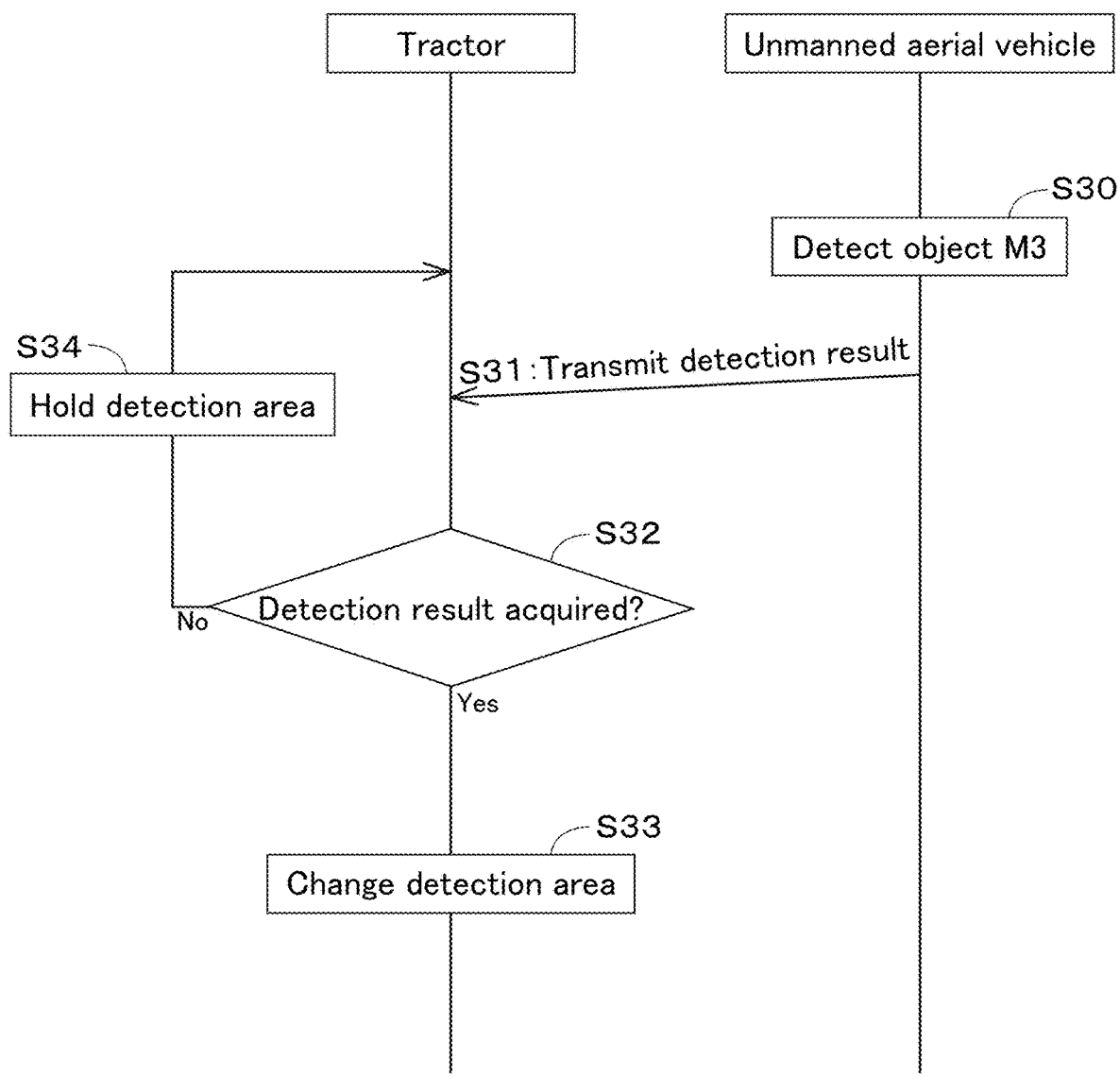
FIG. 12 is a flowchart presenting an operation in which the unmanned aerial vehicle flies in cooperation with the tractor, the operation being different from that presented in FIG. 8.

FIG. 12 is a flowchart presenting an operation in association between the unmanned aerial vehicle 70 and the tractor 1. In FIG. 12, for convenience of explanation, it is assumed that the unmanned aerial vehicle 70 follows the traveling of the tractor 1 and flies in the same direction as the direction of travel of the tractor 1.

As presented in FIG. 12, when the sensor 72 of the unmanned aerial vehicle 70 detects an object M3 (S30), the sensor 72 transmits the detection result of the object M3 to the tractor 1 (S31). The tractor 1 determines whether the detection result of detecting the object M3 is acquired from the unmanned aerial vehicle 70 (S32). When the detection result is acquired (S32, Yes), the tractor 1 changes the detection area A11 to the detection area A12 based on the detection result (S33). In contrast, when the detection result of detecting the object M3 is not acquired from the unmanned aerial vehicle 70 (S32, No), the tractor 1 holds the detection area A11 (S34).

When the unmanned aerial vehicle 70 includes the irradiator 93, the unmanned aerial vehicle 70 also transmits, as the detection result, information indicating whether the object M3 is irradiated with the light to the tractor 1. When acquiring that the irradiator 93 irradiates the object M3 with the light, the tractor 1 sets the detection area A12 so that at least a portion of the light with which the object M3 is irradiated and the object M3 are included in the detection area A12.

Also, for example, when the unmanned aerial vehicle 70 does not detect an object or when the surrounding area of the tractor 1 becomes dark, the irradiator 93 may emit the light source in the direction of travel of the tractor 1.

An agricultural support system as described above includes an obstacle detector 45 provided in or on an agricultural machine (tractor 1) to detect an obstacle, a traveling controller 40A provided in or on the agricultural machine 1 to perform automatic traveling of the agricultural machine 1 when the obstacle detector 45 does not detect the obstacle, and change the automatic traveling when the obstacle detector 45 detects the obstacle, and a sensor 72 provided in or on the unmanned aerial vehicle 70 to sense a situation of an area forward of the agricultural machine 1 in a direction of travel during the automatic traveling of the agricultural machine 1, wherein the obstacle detector 45 changes a detection area for obstacle detection based on a result sensing by the sensor 72. With this, the unmanned aerial vehicle 70 first senses the situation of an area forward of the agricultural machine 1 in the direction of travel during the automatic traveling of the agricultural machine 1, and hence the situation in the direction of travel of the agricultural machine 1 can be monitored first. The unmanned aerial vehicle 70 evaluates the situation, and then the obstacle detector 45 of the agricultural machine 1 can know whether an obstacle is present, and the agricultural machine 1 can smoothly perform the automatic traveling. That is, since the obstacle detector 45 changes the detection area for obstacle detection based on the result of sensing by the sensor 72 of the unmanned aerial vehicle 70 during the automatic traveling of the agricultural machine 1, it is possible to further improve the detection of obstacles during the automatic traveling.

The agricultural support system may include a communication device 75 provided in or on the unmanned aerial vehicle 70 to transmit the result of sensing by the sensor 72 to the agricultural machine 1. With this, it is possible to easily allow the unmanned aerial vehicle 70 to give a notification about the situation of the area forward of the agricultural machine 1 in the direction of travel.

The communication device may be operable to transmit, as the result, information related to a size and a position of a sensed object to the agricultural machine 1. The obstacle detector 45 may be operable to change the detection area based on the size and the position of the object. With this, it is possible to improve the accuracy of object detection by the obstacle detector 45.

The agricultural support system may include an irradiator 93 provided in or on the unmanned aerial vehicle 70 to emit light toward the object when the size of the object sensed by the sensor 72 is a predetermined size or more. With this, by irradiating the object with the light by the irradiator 93, it is easy for the sensor 72 to know the contour and/or the like of the object, and it is possible to improve the detection accuracy.

The obstacle detector 45 may be operable to set the detection area for the object when the object is irradiated with the light. With this, it is possible to more accurately determine whether the object is an obstacle.

The agricultural support system may include an irradiator 93 provided in or on the unmanned aerial vehicle 70 to emit light in the direction of travel of the agricultural machine 1. With this, when work is performed in a dark location such as at night, the situation of an area forward of the agricultural machine 1 in the direction of travel can be easily known with the light from the irradiator 93.

Figure 11B:
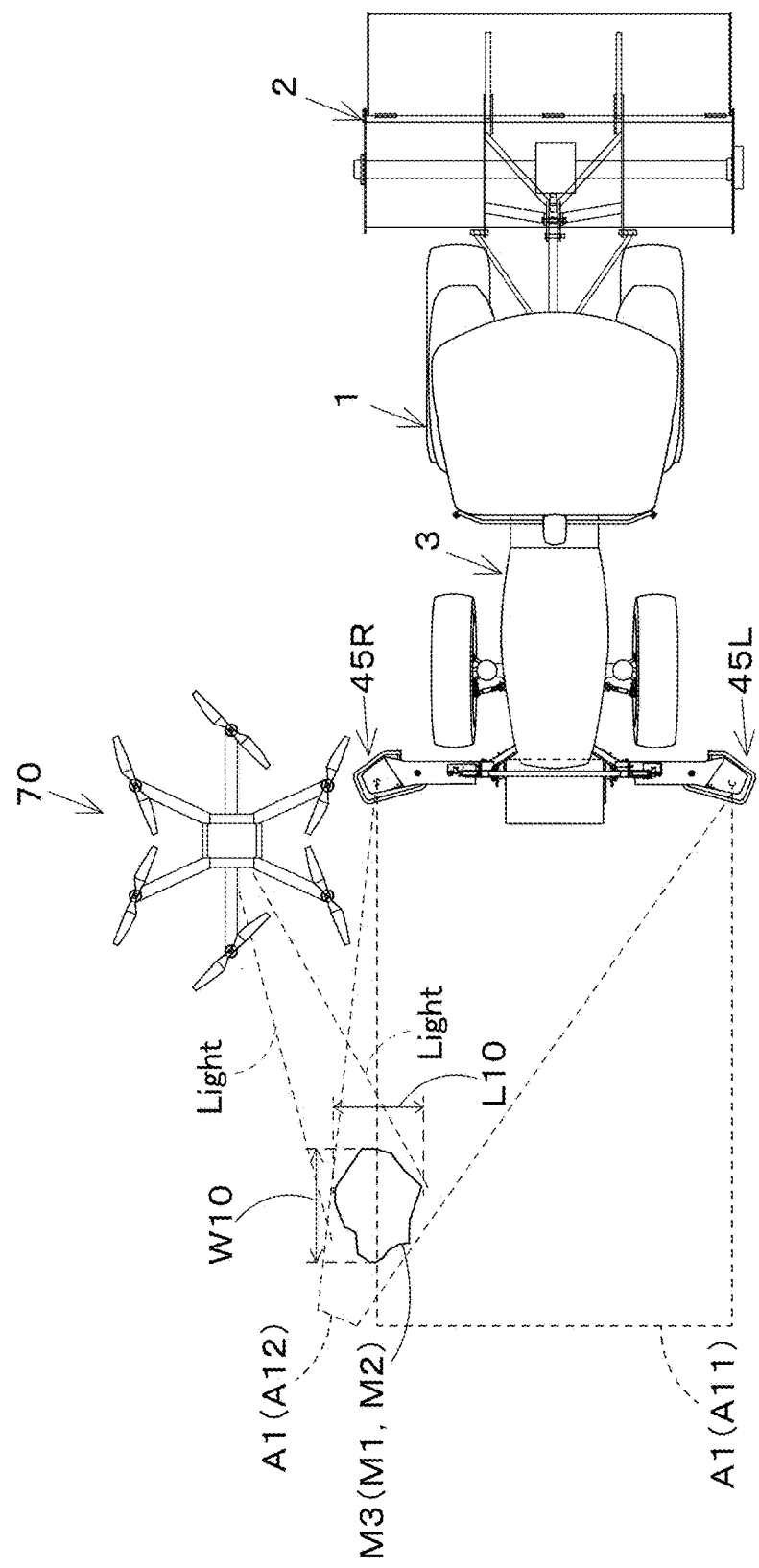
FIG. 11B illustrates a detection area A1 focused toward the object M3.

In the above-described preferred embodiment, as illustrated in FIG. 11A, the obstacle detectors 45L and 45R change the detection area to the detection area A12 when the object M3 is detected, but as illustrated in FIG. 11B, the detection accuracy may be improved by narrowing down the detection area A12 so as to focus on the object M3. Also, with the above-described irradiator 93, the object M3 may be easily recognized through a camera or the like mounted on the tractor 1 by irradiating the object M3 with infrared light.

In the above-described preferred embodiment, the work is performed while the unmanned aerial vehicle 70 and the tractor 1 are associated (cooperated) with each other.

However, when an abnormality occurs in the unmanned aerial vehicle 70 in the association during the work in the agricultural field, the unmanned aerial vehicle 70 or the tractor 1 performs an operation different from the operation during the work.

As described above, the unmanned aerial vehicle 70 flies above the agricultural field H1 based on the flight position D2 detected by the position detector 73 during the work of the tractor 1 in the agricultural field H1 (while the tractor 1 is traveling in the agricultural field H1), and stops the flight based on the flight position D2 and flies based on information sensed by the sensor 72 during the abnormality.

Figure 13:
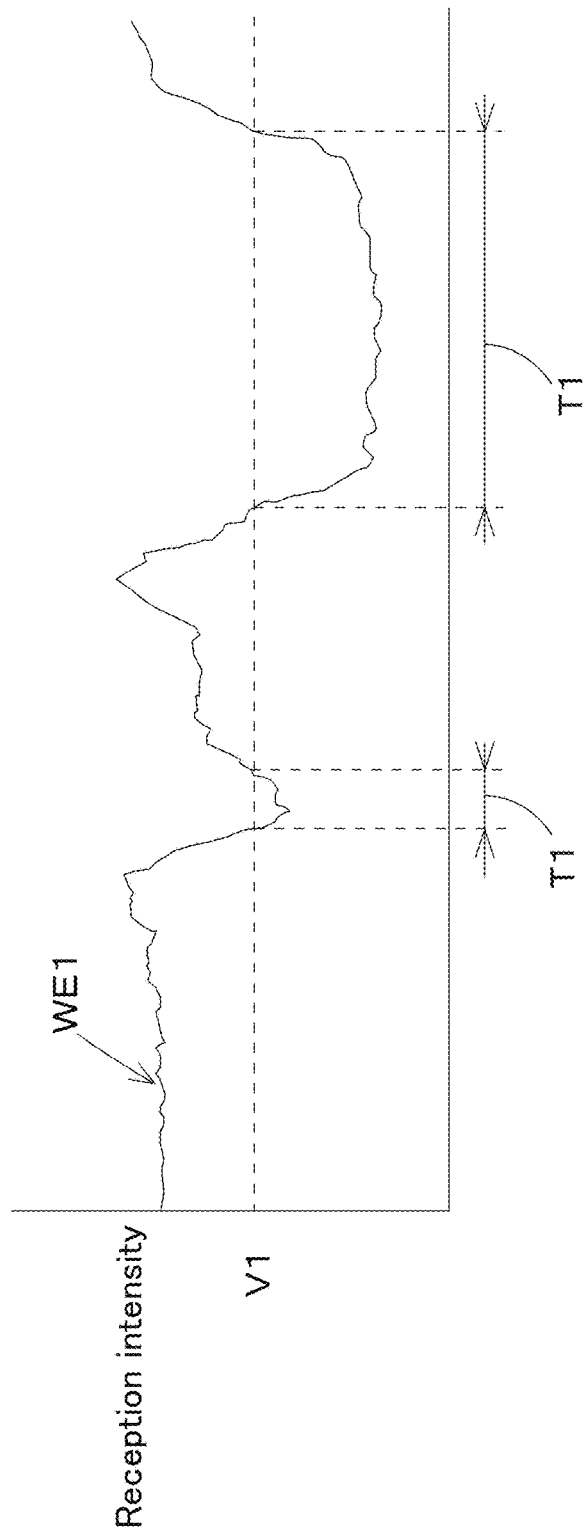
FIG. 13 presents an example of a reception intensity of radio waves WE1.

More specifically, as illustrated in FIG. 13, the controller 76 of the unmanned aerial vehicle 70 monitors a reception intensity of radio waves WE1 from positioning satellites during flight of the unmanned aerial vehicle 70. When the reception intensity of the radio waves WE1 is less than a threshold V1, the controller 76 calculates an elapsed time T1 during which the reception intensity is less than the threshold V1. The controller 76 determines that an abnormality occurs when the elapsed time T1 is a predetermined time T2 or more, and determines that the abnormality does not occur but a malfunction occurs when the elapsed time T1 is less than the predetermined time T2.

Figure 6B:
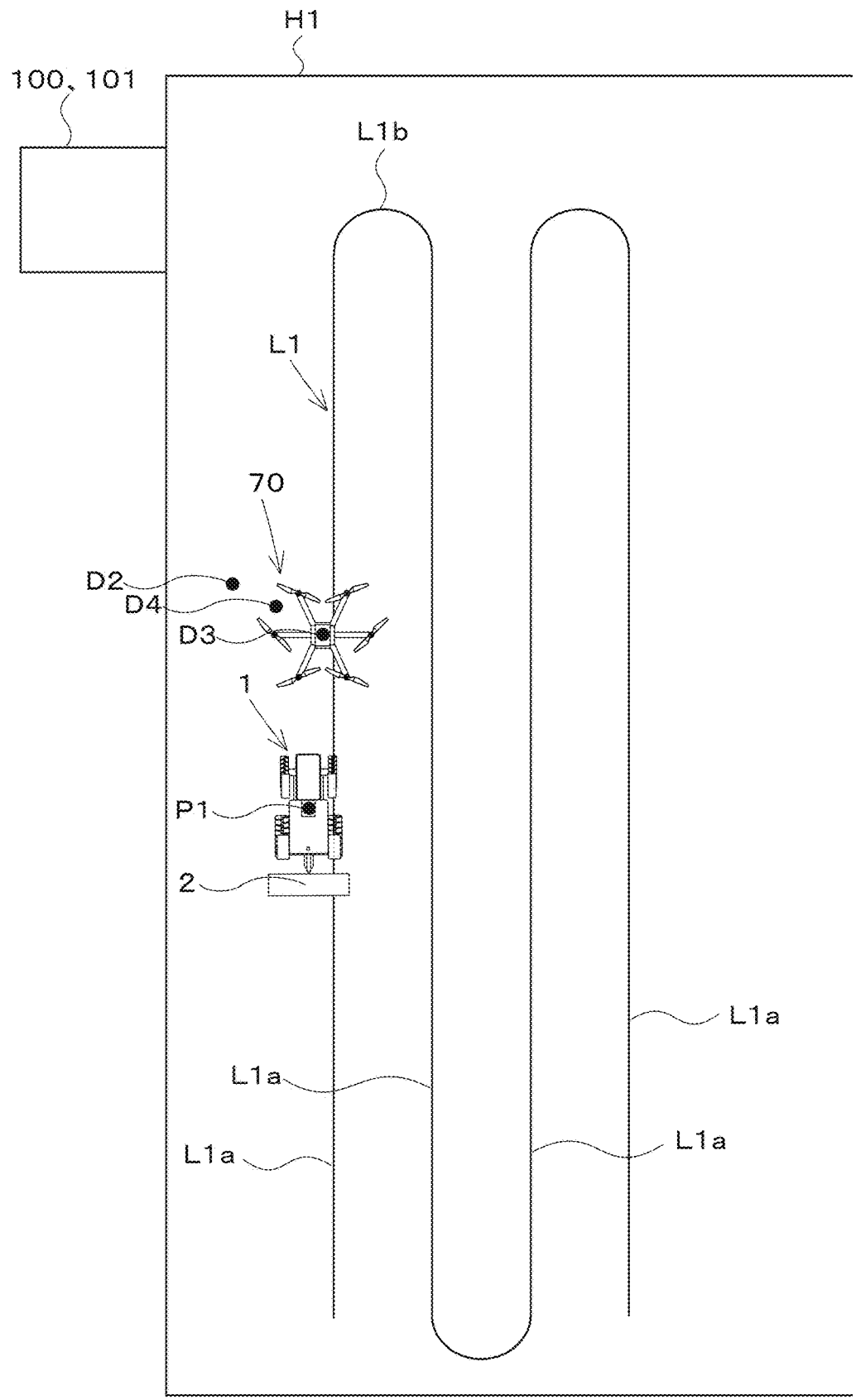
FIG. 6B is an explanatory diagram for estimating flight positions D3 and D4.

As described above, when the elapsed time T1 during which the reception intensity of the radio waves WE1 is the threshold V1 or less is long, the flight position D2 cannot be accurately detected by the position detector 73. Thus, the controller 76 determines an occurrence of an abnormality in the unmanned aerial vehicle 70 and the sensor 72 performs sensing in the direction of travel of the unmanned aerial vehicle 70. For example, the sensor 72 acquires a captured image of an area in the direction of travel of the unmanned aerial vehicle 70, and as illustrated in FIG. 6B, the controller 76 estimates at least a flight position D3 of the unmanned aerial vehicle 70 from the captured image, and flies toward a predetermined return location 101. When reaching above the return location 101, the controller 76 causes the unmanned aerial vehicle 70 to land on the return location 101. The way of estimating the flight position D3 is not limited. The controller 76 may estimate the flight position D3 from the captured image by, for example, storing map data including agricultural fields, structures (roads, buildings, electric poles), landforms (mountains, rivers), and so forth, in the memory 74 in advance and comparing the map data with the captured image to perform matching or the like, or may acquire the flight position D3 by calculating the flight direction and the flight position D3 from the current position based on a change in the captured image.

In contrast, when the unmanned aerial vehicle 70 is malfunctioning, the controller 76 may cause the unmanned aerial vehicle 70 to fly based on the flight position D2 detected by the position detector 73 and the information sensed by the sensor 72. For example, the controller 76 acquires the flight position D2 detected by the position detector 73, and acquires information such as a captured image sensed by the sensor 72. The controller 76 calculates the flight direction and the flight position from the current position based on a change in the captured image, compares the calculated flight position (first estimated position) D3 with the flight position (second estimated position) D2 detected by the position detector 73, and when the difference between the first estimated position D3 and the second estimated position D2 is a threshold or less, adopts the second estimated position D2 to continue to control the flight. As illustrated in FIG. 6B, when the difference between the first estimated position D3 and the second estimated position D2 is larger than the threshold, for example, the controller 76 corrects an intermediate point connecting the first estimated position D3 and the second estimated position D2 as a flight position D4 and continues to control the flight at the corrected flight position D4. Alternatively, when the difference between the first estimated position D3 and the second estimated position D2 is larger than the threshold, the controller 76 refers to the transition of the second estimated position D2 several seconds ago, adopts the first estimated position D3 as the flight position D4 when the second estimated position D2 is largely changed, and continues to control the flight at the adopted flight position D4. The above-described estimation and so forth of the flight position is merely an example and is not limited thereto.

Figure 14:
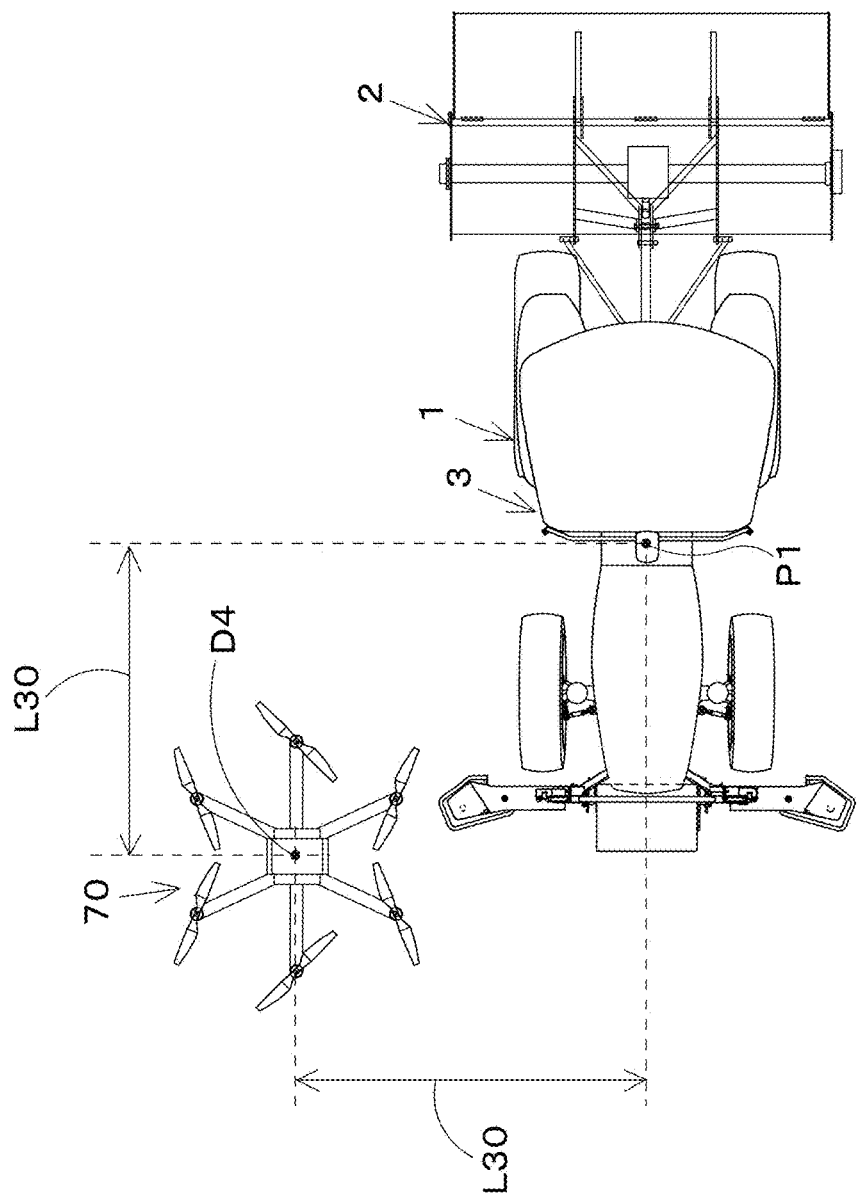
FIG. 14 illustrates a horizontal distance L30 between the tractor and the unmanned aerial vehicle.

When the unmanned aerial vehicle 70 is malfunctioning, the controller 76 regulates the distance from the unmanned aerial vehicle 70 to the tractor 1 during the flight in accordance with the elapsed time T1. As illustrated in FIG. 14, when the unmanned aerial vehicle 70 is malfunctioning, the controller 76 calculates a horizontal distance (a horizontal distance in the direction of travel (front-rear direction), a horizontal distance in the width direction) L30 between the tractor 1 and the unmanned aerial vehicle 70 based on the flight position D4 obtained using the first estimated position D3 and the second estimated position D2 and based on the travel position P1 transmitted from the tractor 1. The controller 76 determines whether the calculated horizontal distance L30 is a limit distance or less. When the horizontal distance L30 is the limit distance or less, the controller 76 causes the unmanned aerial vehicle 70 to fly away from the tractor 1. In contrast, when the horizontal distance L30 is not the limit distance or less, the controller 76 continues the flight while referring to the flight position obtained using the first estimated position D3 and the second estimated position D2. The controller 76 increases or decreases the limit distance in accordance with the elapsed time T1, and sets the limit distance to be larger as the elapsed time T1 becomes shorter, and sets the limit distance to be smaller as the elapsed time T1 becomes longer.

The tractor 1 includes a PTO shaft to transmit power to a working implement 2, a raising/lowering device 8 to raise or lower the working implement 2, and a traveling device 7. The tractor 1 rotates the PTO shaft, actuates the raising/lowering device 8, and actuates the traveling device 7 during work in accordance with the work. The tractor 1 stops at least one of the rotation of the PTO shaft, the raising/lowering device 8, and the traveling device 7 when the unmanned aerial vehicle 70 is abnormal. The rotation of the PTO shaft and the actuation and stop of the raising/lowering device 8 and the traveling device 7 can be controlled by the controller 40.

Figure 15:
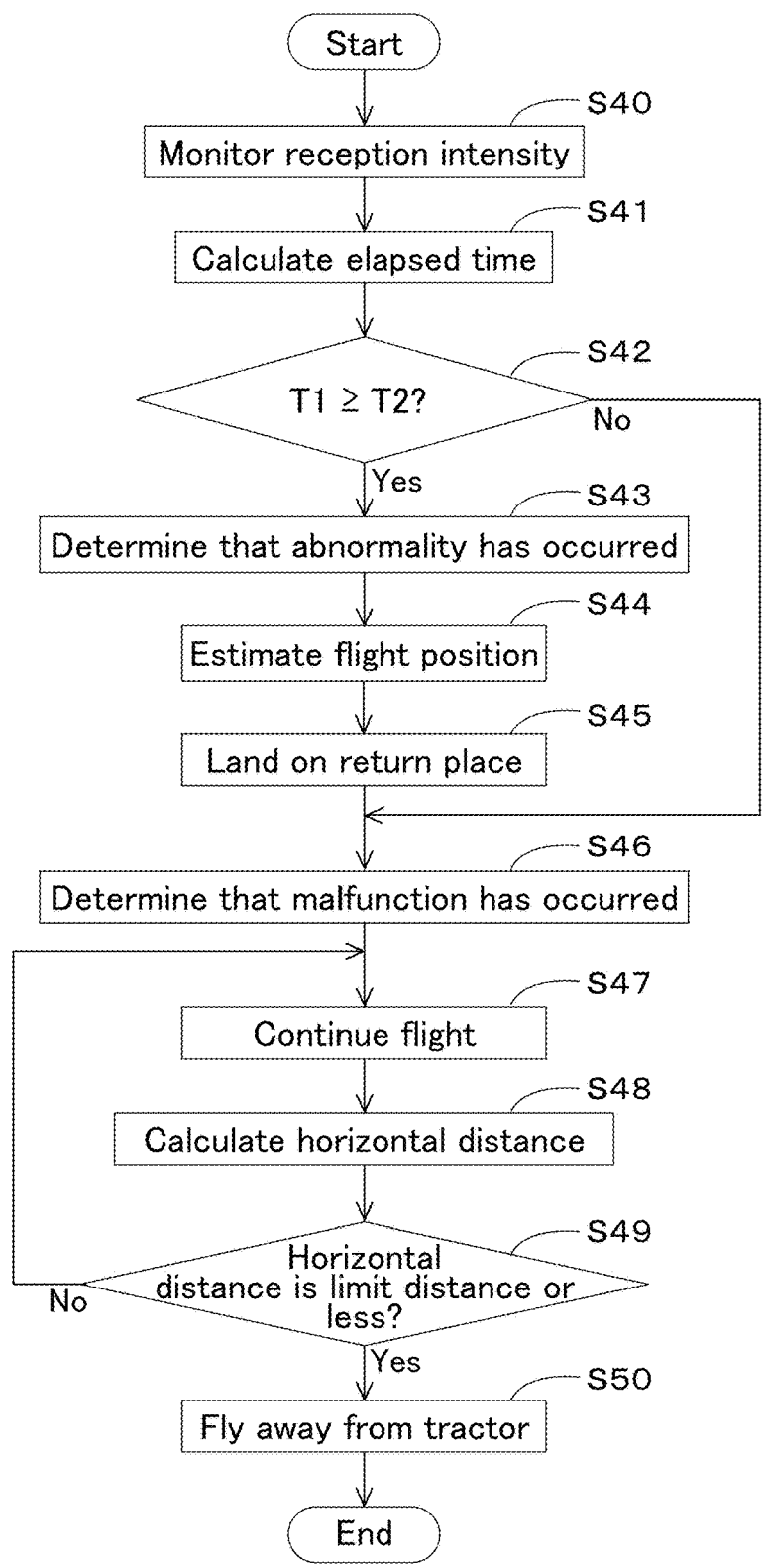
FIG. 15 is a flowchart presenting an operation in which the unmanned aerial vehicle flies in cooperation with the tractor, the operation being different from those presented in FIG. 8 and FIG. 12.

FIG. 15 is a flowchart presenting an operation in association between the unmanned aerial vehicle 70 and the tractor 1. Also in FIG. 15, for convenience of explanation, when a malfunction or an abnormality does not occur, it is assumed that the unmanned aerial vehicle 70 follows the traveling of the tractor 1 and flies in the same direction as the direction of travel of the tractor 1.

As presented in FIG. 15, in a situation in which the unmanned aerial vehicle 70 is flying forward of the tractor 1 while the sensor 72 performs sensing, the controller 76 monitors the reception intensity of the radio waves WE1 from the positioning satellites (S40). The controller 76 calculates the elapsed time T1 during which the reception intensity of the radio waves WE1 is the threshold V1 or less (S41). The controller 76 determines whether the elapsed time T1 is the predetermined time T2 or more (S42). When the elapsed time T1 is the predetermined time T2 or more (S42, Yes), the controller 76 determines that an abnormality occurs (S43), and estimates the flight position with the sensor 72 (S44). The controller 76 continues to control the flight while estimating the flight position, and causes the unmanned aerial vehicle 70 to land on the return location 101 (S45). In contrast, when the elapsed time T1 is less than the predetermined time T2 (S42, No), the controller 76 determines that a malfunction occurs (S46), estimates the flight position D4 using the first estimated position D3 and the second estimated position D2, and continues the flight while causing the unmanned aerial vehicle 70 to follow the tractor 1 (S47). The controller 76 calculates the horizontal distance L30 between the flight position D4 and the travel position P1 (S48). When the horizontal distance L30 is the limit distance or less (S49, Yes), the controller 76 causes the unmanned aerial vehicle 70 to fly away from the tractor 1 (S50).

In the above-described preferred embodiment, the abnormality, the malfunction, or the like, is determined based on the reception intensity, but the abnormality, the malfunction, or the like, may be determined based on a remaining amount (remaining charge amount) of the power storage 71 instead of the reception intensity. In this case, the reception intensity may be read as the remaining charge amount.

Also, the threshold V1 corresponding to the reception intensity or the remaining charging amount may be changed depending on the work condition. For example, when the working implement 2 is a halo, a rice transplanter, or the like, and works in a water-containing location, the threshold V1 is increased to make the standard stricter.

An agricultural support system as discussed above includes an unmanned aerial vehicle 70 including a sensor 72, and an agricultural machine (tractor 1) to travel in an agricultural field, wherein when an abnormality occurs in the unmanned aerial vehicle 70 while the agricultural machine 1 performs work in the agricultural field in cooperation with the unmanned aerial vehicle 70, the unmanned aerial vehicle 70 or the agricultural machine 1 performs an operation different from an operation during the work. With this, in the situation in which the agricultural machine 1 performs the work in the agricultural field in cooperation with the unmanned aerial vehicle 70, interference of the unmanned aerial vehicle 70 or the agricultural machine 1 with the other can be prevented or reduced by performing an operation different from the operation during the work. That is, when the agricultural machine 1 performs work in the agricultural field in cooperation with the unmanned aerial vehicle 70, it is possible to appropriately deal with the abnormality if the abnormality occurs in the unmanned aerial vehicle.

The unmanned aerial vehicle 70 may include a position detector 73 to detect a position. The unmanned aerial vehicle 70 may be operable to fly above the agricultural field based on the position detected by the position detector 73 during the work, and stop flying based on the position and flies based on information sensed by the sensor 72 when the abnormality occurs. With this, when the unmanned aerial vehicle 70 flies while the position detector 73 detects the position, the flight of the unmanned aerial vehicle 70 can be stabilized by performing the flight based on the information sensed by the sensor 72 instead of the flight based on the position in case of abnormality.

The unmanned aerial vehicle 70 may be operable to fly toward a predetermined return location based on the information and lands on the return location when the abnormality occurs. With this, the unmanned aerial vehicle 70 can be returned to the return location when an abnormality occurs.

The position detector 73 may be a device to detect the position based on radio waves from one or more positioning satellites. The unmanned aerial vehicle 70 may be operable to determine whether the abnormality has occurred based on an elapsed time during which a reception intensity of the radio waves from the one or more positioning satellites is less than a threshold. With this, it is possible to quickly change the flight of the unmanned aerial vehicle 70 to a state different from a normal state by determining that the abnormality has occurred when the reception intensity of the radio waves from the positioning satellites changes, that is, the reception intensity is less than the threshold and an accurate position cannot be determined.

The unmanned aerial vehicle 70 may be operable to determine that the abnormality has occurred when the elapsed time is a predetermined time or more, and determine that the abnormality has not occurred but a malfunction has occurred when the elapsed time is less than the predetermined time. With this, it is possible to quickly determine whether the unmanned aerial vehicle 70 undergoes abnormality or malfunction.

The unmanned aerial vehicle 70 may be operable to fly based on the position detected by the position detector 73 and the information sensed by the sensor 72 when the malfunction occurs. With this, when the unmanned aerial vehicle 70 undergoes malfunction, it is possible to continue stable flight.

The unmanned aerial vehicle 70 may be operable to, when the malfunction occurs, regulate a distance from the unmanned aerial vehicle 70 to the agricultural machine 1 during flight in accordance with the elapsed time. With this, it is possible to eliminate or reduce the likelihood that the unmanned aerial vehicle 70 and the agricultural machine 1 will interfere with each other.

The agricultural machine 1 may include a PTO driver to transmit power to the working implement 2, a raising/ lowering device 8 to raise and lower the working implement 2, and a traveling device 7, and actuate the PTO driver, the raising/lowering device 8, and the traveling device 7 in accordance with work during the work, and stop at least one of the PTO driver, the raising/lowering device 8, or the traveling device 7, when the abnormality occurs. With this, by stopping the PTO driver, the raising/lowering device 8, and/or the traveling device 7, the work can be easily stopped.

Second Preferred Embodiment

FIG. 16 to FIG. 19 illustrate an agricultural machine (tractor 1) according to a second preferred embodiment. The tractor 1 and so forth illustrated in FIG. 16 to FIG. 19 may be applied to the first preferred embodiment.

The tractor 1 includes a takeoff/landing station 60. The takeoff/landing station 60 is provided on the roof 9b of the protector 9 and can regulate the skid 70d when the unmanned aerial vehicle 70 lands. As illustrated in FIGS. 18A to 18C, when the unmanned aerial vehicle 70 takes off or lands, a portion of the takeoff/landing station 60 comes into contact with the legs 80a and 80b of the skid 70d, and hence the takeoff/landing station 60 can restrict movement in the horizontal direction of the skid 70d.

Figure 16:
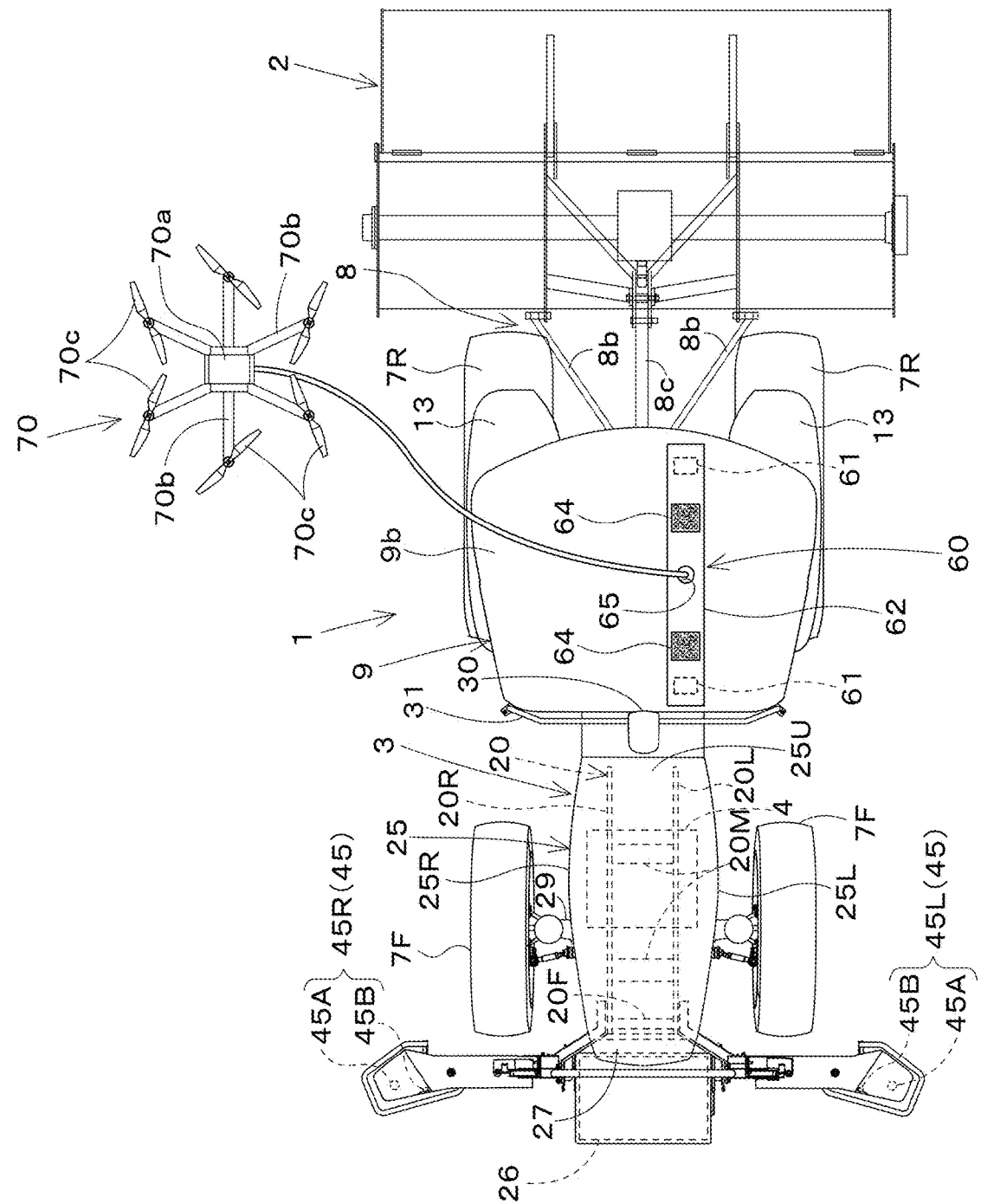
FIG. 16 is an overall plan view of a tractor including a takeoff/landing station according to a second preferred embodiment of the present invention.
Figure 17:
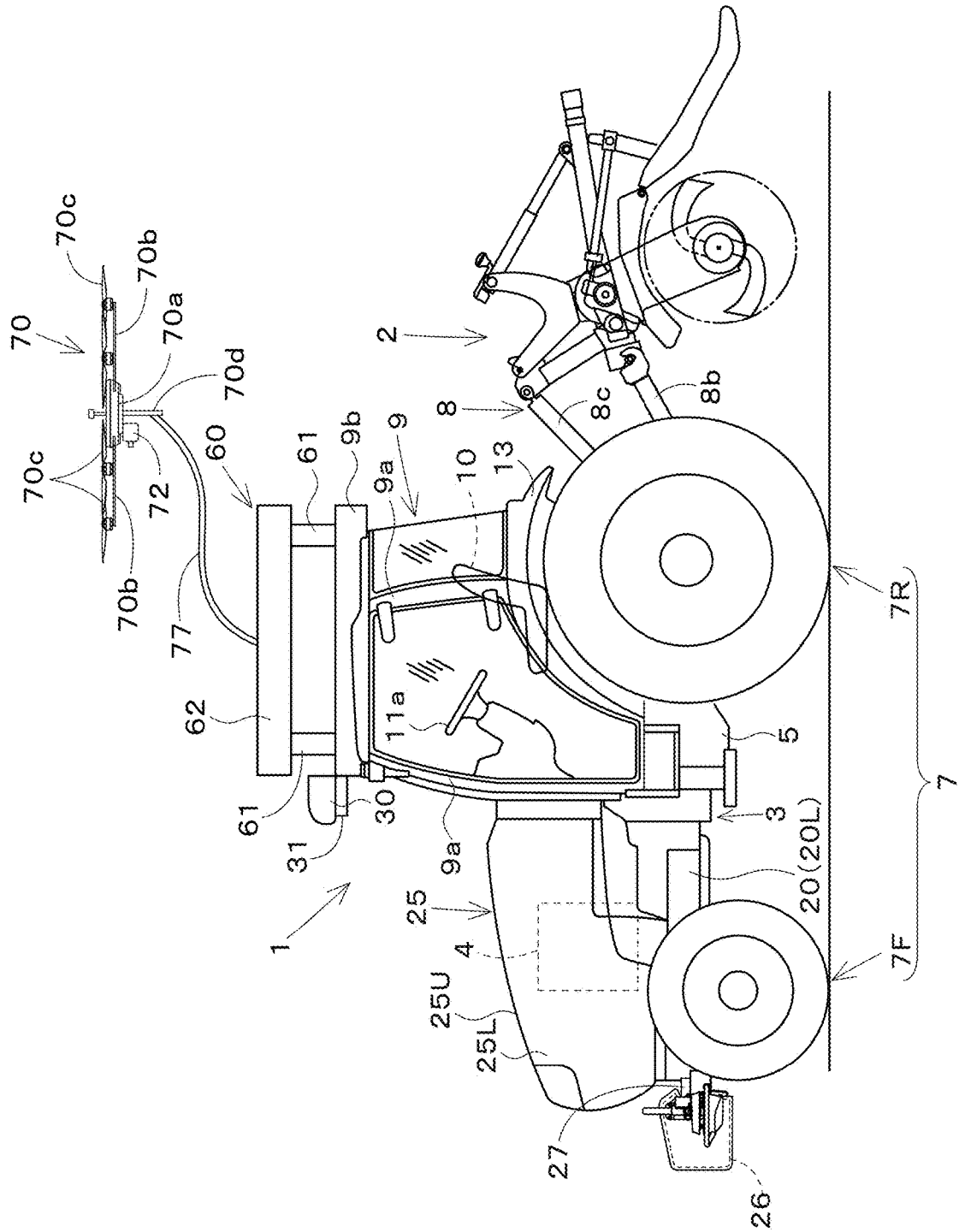
FIG. 17 is an overall side view of the tractor including the takeoff/landing station.
Figure 19:
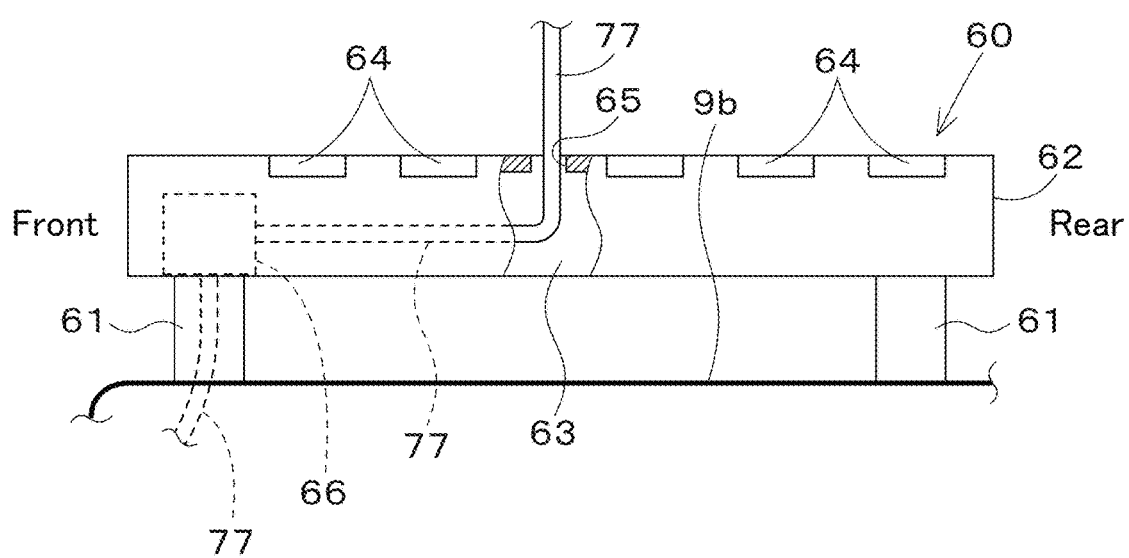
FIG. 19 is an enlarged view of the landing station.

As illustrated in FIG. 16 and FIG. 17, specifically, the takeoff/landing station 60 includes at least one support member 61 and an arm 62. The support member 61 is a member that supports the arm 62 on the roof 9b of the protector 9, and is provided on each of a front portion and a rear portion of the roof 9b. The arm 62 is supported on the roof 9b via the support members 61 and extends in the horizontal direction. Specifically, one end of the arm 62 is positioned at a front end of the roof 9b, and the other end of the arm 62 is positioned at a rear end of the roof 9b.

The arm 62 includes, for example, a cylindrical body having an arc shape or a quadrangle shape, is hollow, and has a space 63 formed therein. As illustrated in FIGS. 18A to 18C, in the unmanned aerial vehicle 70, when a distance L40 from one leg 80a to the other leg 80b at the time of landing is used as a reference, a width L41 of the arm 62 is set to be the distance L40 or less.

As illustrated in FIG. 16, the arm 62 includes a marker 64 that is visually recognizable by the unmanned aerial vehicle 70. The marker 64 is formed on an outer surface of the arm 62, and can be recognized by the sensor 72 of the unmanned aerial vehicle 70 from above when the arm 62 is seen in a plan view.

When the unmanned aerial vehicle 70 lands, the presence or absence of the tractor 1, that is, the position of the marker 64 provided on the arm 62 is first recognized by the sensor 72 from above the agricultural field. When the controller 76 of the unmanned aerial vehicle 70 recognizes the marker 64, the controller 76 causes the unmanned aerial vehicle 70 to fly toward the position of the marker 64. When the unmanned aerial vehicle 70 reaches above the marker 64, the controller 76 causes the unmanned aerial vehicle 70 to land toward the arm 62 (marker 64) while gradually lowering the altitude of the unmanned aerial vehicle 70.

In the case of the skid 70d illustrated in FIG. 18A, the unmanned aerial vehicle 70 ends landing when the legs 80a and 80b of the skid 70d come into contact with the arm 62. In the case of the skid 70d illustrated in FIG. 18B, the unmanned aerial vehicle 70 swings the legs 80a and 80b toward the arm 62 by extension or contraction of the actuators 81a and 81b at the time when the skid 70d reaches the arm 62, and ends landing when the legs 80a and 80b come into contact with the arm 62. The extension or contraction of the actuators 81a and 81b is performed by the controller 76 outputting control signals to the actuators 81a and 81b.

In the case of the skid 70d illustrated in FIG. 18C, when the skid 70d reaches the arm 62 and the legs 80a and 80b come into contact with the arm 62, the legs 80a and 80b of the unmanned aerial vehicle 70 are deformed by the contact with the arm 62. The unmanned aerial vehicle 70 ends landing when the arm 62 is sandwiched between the legs 80a and 80b.

As described above, by providing the takeoff/landing station 60 at the tractor 1, the unmanned aerial vehicle 70 can be landed on the tractor 1.

The unmanned aerial vehicle 70 may include a cable 77. Next, a case where the unmanned aerial vehicle 70 includes the cable 77 will be described.

The cable 77 is a cable to supply electric power to the unmanned aerial vehicle 70. As illustrated in FIG. 24, one end of the cable 77 is provided inside the main body 70a and is connected via a connector or the like to a power supply line PW1 that supplies electric power to the controller 76 or the like. Alternatively, the one end of the cable 77 may be connected to the power storage 71. The other end of the cable 77 is connected via a connector or the like to a power supply line PW2 that supplies electric power to the controller 40 or the like. The other end of the cable 77 may be connected to a battery or the like provided in the tractor 1.

Thus, electric power of the tractor 1 can be supplied to the unmanned aerial vehicle 70 via the cable 77, and the unmanned aerial vehicle 70 can fly for a long time.

Figure 20:
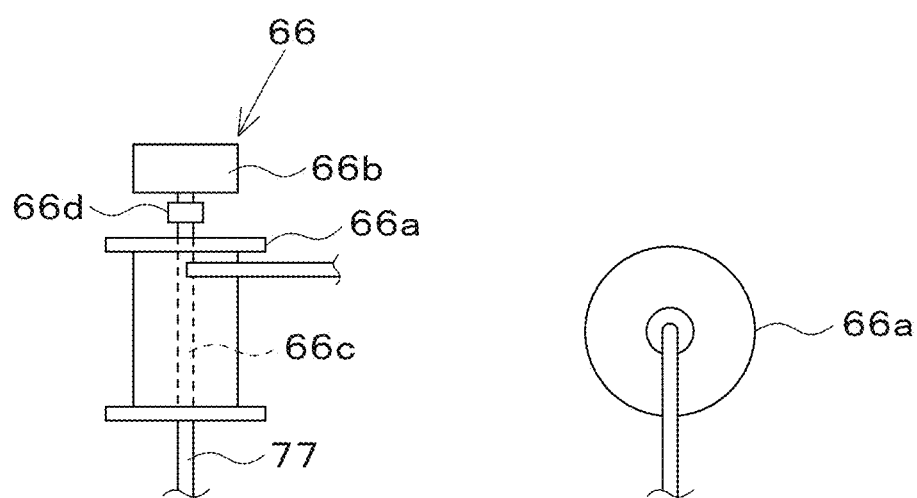
FIG. 20 illustrates a winder.

As illustrated in FIGS. 18A to 18C and FIG. 19, the arm 62 of the takeoff/landing station 60 has a through hole 65 through which the cable 77 passes, and the space 63 of the arm 62 serves as a housing capable of housing the cable 77. The housing is provided with a winder 66 for winding the cable 77. As illustrated in FIG. 20, the winder 66 includes a cylindrical bobbin (winding portion) 66a that is rotatably supported and winds the cable 77 by rotation, and a motor 66b that rotates the bobbin 66a. The cable 77 passes through a rotation shaft 66c of the bobbin 66a and reaches the inside of the tractor 1.

Thus, the cable 77 can be wound by rotating the bobbin 66a of the winder 66 by the motor 66b. When the cable 77 is pulled by movement of the unmanned aerial vehicle 70 in a state in which the cable 77 is wound around the bobbin 66a, the bobbin 66a is rotated desirably by the pulling force and the cable 77 can be unwound. The winder 66 may be provided with a clutch 66d capable of disconnecting a rotation shaft of the motor 66b and the rotation shaft 66c of the bobbin 66a from each other.

As described above, when the winder 66 is provided, the controller 40 of the tractor 1 outputs a control signal to the motor 66b to rotate the rotation shaft of the motor 66b in a direction (winding direction) in which the cable 77 is wound. In a situation in which the rotation shaft of the motor 66b is rotated in the winding direction, a force (first load) acting on the rotation shaft of the motor 66b or a force (second load) acting on the rotation shaft 66c of the bobbin 66a is referred to. For example, when the cable 77 is pulled with movement of the unmanned aerial vehicle 70 and the first load or the second load becomes a predetermined value or more, the controller 40 stops driving the motor 66b, that is, stops rotating the motor 66b in the winding direction. Alternatively, when the first load or the second load becomes the predetermined value or more, the controller 40 rotates the motor 66b in a direction opposite to the winding direction to unwind the cable 77.

That is, the controller 40 drives the winder 66 so that the tension acting on the cable 77 becomes substantially constant.

The unmanned aerial vehicle 70 senses the agricultural field H1 from above the tractor 1 before the tractor 1 performs work in the agricultural field H1 by automatic traveling, that is, before ground work is performed in the agricultural field H1 with the working implement 2. For example, the unmanned aerial vehicle 70 takes off from the tractor 1 in a state in which the tractor 1 is stopped in the agricultural field H1, and the sensor 72 captures an image of, for example, a state before the work is performed in the agricultural field H1 (before the work), for example, a soil state of the agricultural field H1.

Figure 21:
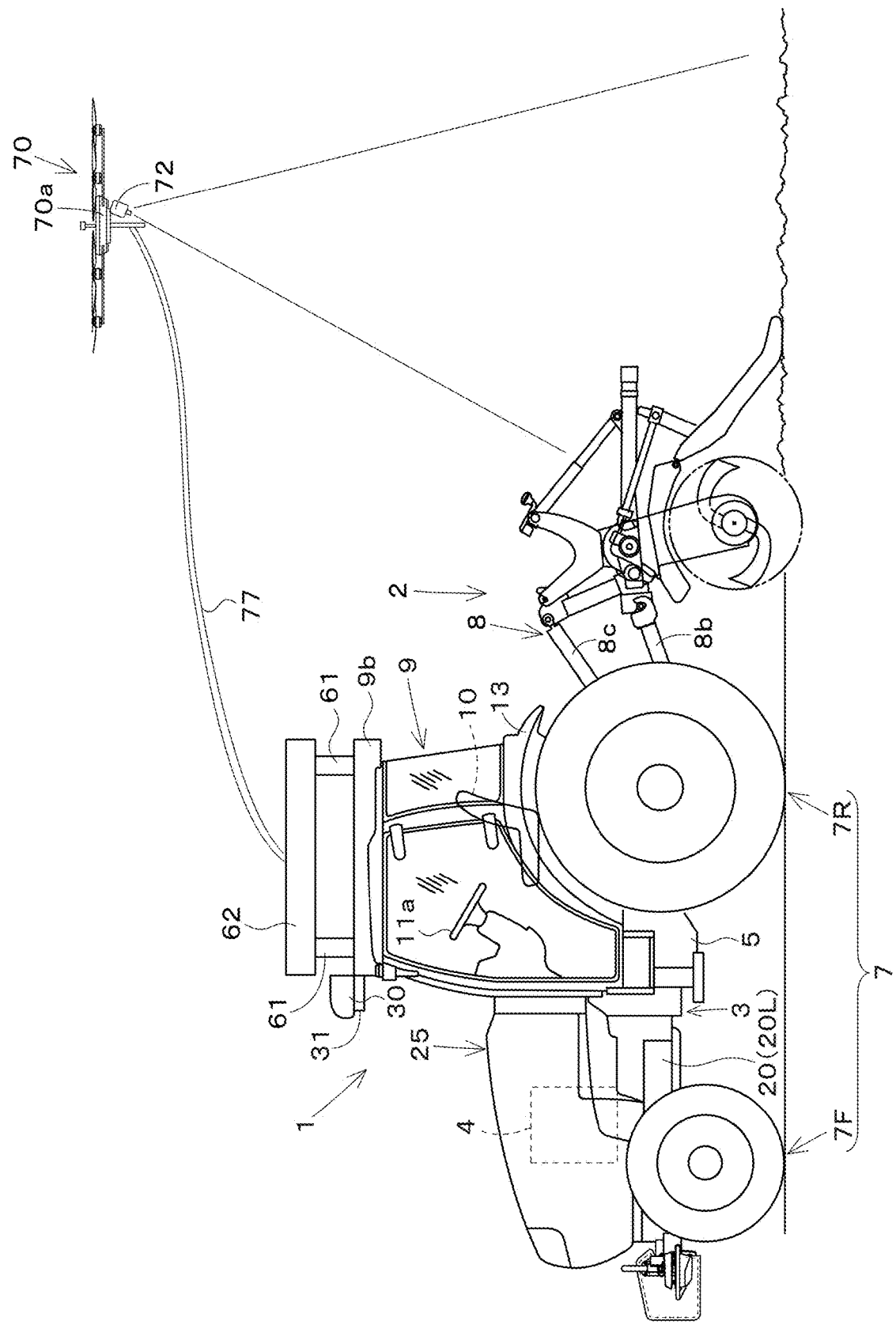
FIG. 21 illustrates flight of the unmanned aerial vehicle when the tractor starts traveling and working according to the second preferred embodiment.

As illustrated in FIG. 21, when the tractor 1 starts traveling and performing work (starts automatic traveling), the unmanned aerial vehicle 70 directs the sensor 72 to the rear of the working implement 2 and senses the state of the agricultural field H1 while the work is performed (during the work) or after the work is performed (after the work). For example, when the tractor 1 travels in the agricultural field H1 and performs the work with the working implement 2, the unmanned aerial vehicle 70 flies while following the traveling of the tractor 1, and captures an image of a state of the agricultural field H1 after the work, for example, a soil state (state of surface unevenness) of the agricultural field H1 by the sensor 72. That is, the unmanned aerial vehicle 70 acquires a captured image during the work or after the work of the tractor 1.

A captured image during the work (in-work image) and a captured image after the work (post-work image) captured by the unmanned aerial vehicle 70 are transmitted to the tractor 1 via the communication device 75 or the like.

The tractor 1 performs the work with the working implement 2 based on the state of the agricultural field H1 (the state of surface unevenness before the work, the state of surface unevenness during the work, and the state of surface unevenness after the work) when the unmanned aerial vehicle 70 senses the agricultural field H1. Specifically, when acquiring the pre-work image before the work, the tractor 1 sets the working implement 2 based on the pre-work image. For example, the controller 40 estimates the hardness of the soil, the degree of unevenness of the soil, the geologic features of the soil, and so forth, from the pre-work image. The hardness of the soil, the degree of unevenness of the soil, and the geologic features of the soil are estimated by comparing the pre-work image with a database of soil information stored in advance in the controller 40 or the like. In the soil information, the past captured image is associated with the hardness of the soil, the degree of unevenness of the soil, the geologic features of the soil, and so forth. Thus, the hardness of the soil, the degree of unevenness of the soil, the geologic features of the soil, and so forth, can be estimated from the pre-work image. Alternatively, the hardness of the soil, the degree of unevenness of the soil, and the geologic features of the soil may be estimated by applying the pre-work image to a trained model for estimating the hardness of the soil, the degree of unevenness of the soil, and the geologic features of the soil.

When the working implement 2 is a cultivator and it is estimated that the hardness of the soil is a threshold or more, the controller makes the speed of cultivation performed by the working implement 2 (the rotational speed of cultivation claws) less than a predetermined set value, and when the hardness of the soil is less than the threshold, the controller sets the speed of cultivation to the set value. Alternatively, when the working implement 2 is a cultivator and the degree of unevenness of the soil is a threshold or more, the controller makes the area of cultivation per unit time, that is, the moving speed of the cultivator, less than a predetermined set value, and when the degree of unevenness of the soil is less than the threshold, the controller sets the moving speed of the cultivator to the set value. In the above-described preferred embodiment, the cultivator is described as an example. However, the working implement 2 may be any device and is not limited.

As illustrated in FIG. 24, the controller 40 of the tractor 1 includes a work determiner 40C. The work determiner 40C includes an electric/electronic circuit provided in the controller 40, a program stored in the controller 40, and so forth.

The work determiner 40C determines whether the work with the working implement 2 is appropriate based on the state of the agricultural field H1 during the work or after the work. Specifically, the work determiner 40C acquires an in-work image or a post-work image, and determines whether the work is appropriate from the in-work image or the post-work image.

When the working implement 2 is a spreader (fertilizer spreader, agricultural chemical spreader), the work determiner 40C determines whether the fertilizer spreading or the agricultural chemical spreading is appropriately performed from the in-work image. For example, the work determiner 40C monitors the spreading state from the in-work image, and determines that the work is appropriate when the fertilizer or the agricultural chemical is appropriately spread from a nozzle that spreads the fertilizer or the agricultural chemical. In contrast, the work determiner 40C determines that the work is not appropriate when the fertilizer or the agricultural chemical is not discharged from the nozzle that performs the fertilizer spreading or the agricultural chemical spreading, or when the amount of the fertilizer or the agricultural chemical discharged from the nozzle that performs the fertilizer spreading or the agricultural chemical spreading is smaller than a prescribed amount.

Alternatively, when the working implement 2 is a cultivator, a harvester, a hilling device, or the like, the work determiner 40C determines whether cultivation, harvesting, hilling, or the like, is appropriately performed from the post-work image. For example, the work determiner 40C monitors the cultivated state, the harvested state, and the hilled state from the post-work image, determines that the work is appropriate when the cultivated state, the harvested state, and the hilled state are substantially the same as predetermined states, and determines that the work is not appropriate when the cultivated state, the harvested state, and/or the hilled state are significantly different from the predetermined states.

Whether the cultivated state, the harvested state, and the hilled state are appropriate can be determined by matching the cultivated state, the harvested state, and the hilled state in the database with the cultivated state, the harvested state, and the hilled state obtained from the post-work image, the work states indicating the appropriate cultivated state, cultivated state, harvested state, and hilled state being stored in advance as a database in the controller 40 or the like. Alternatively, the work determiner 40C may determine whether the cultivated state, the harvested state, and the hilled state after the work are appropriate by applying the post-work image to a trained model that can estimate each of the cultivated state, the harvested state, and the hilled state.

Figure 22:
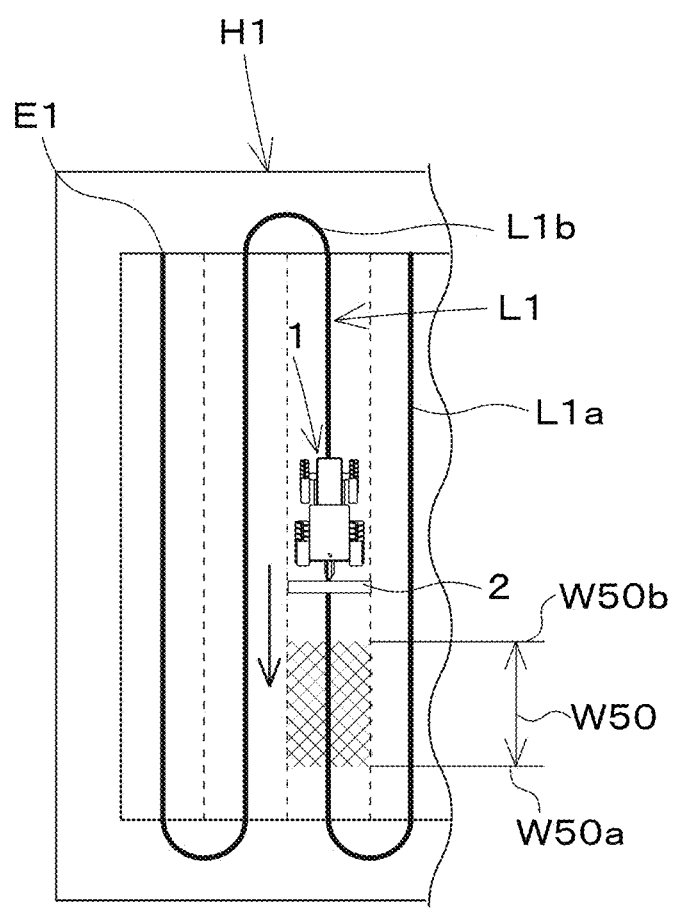
FIG. 22 illustrates an inappropriate range W50.

When the work is appropriate, the tractor 1 continues the work. When the work determiner 40C determines that the work is not appropriate, the tractor 1 returns to the position of the inappropriate work and performs the work again with the working implement 2. As illustrated in FIG. 22, in a situation in which the tractor 1 performs the work while automatically traveling, when an inappropriate range W50 is present in the agricultural field H1 where positions at which the work is not appropriate are continuous, the tractor 1 stops the current work of the working implement 2, returns to the inappropriate range W50 while stopping the work of the working implement 2, resumes the working implement 2 at a work start point W50a of the inappropriate range W50, and performs the work again while traveling to a work end point W50b of the inappropriate range W50.

Figure 23:
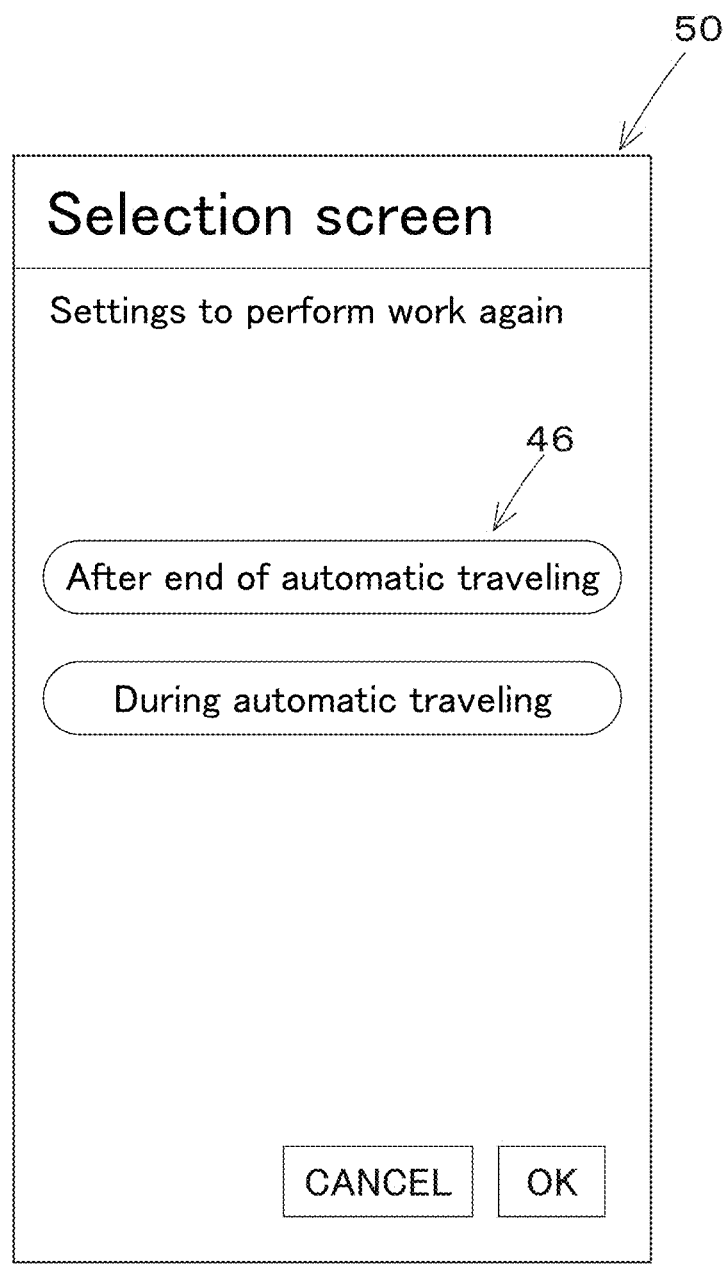
FIG. 23 illustrates an example of a selector.

As illustrated in FIG. 23, the agricultural support system includes a selector 46. The selector 46 is provided in the display 50 provided in the tractor 1 or a mobile terminal of a portable computer, such as a smartphone, a tablet, or a notebook computer that can be connected to the tractor 1. Specifically, the selector 46 is a hardware switch or a software switch provided in the display 50 or the mobile terminal. For example, when the display 50 or the mobile terminal is provided with the selector 46, and when a predetermined operation is performed, the selector 46 is displayed on the display 50 or the mobile terminal as illustrated in FIG. 23. The selector 46 is a switch operable to select whether to perform the work again after the end of automatic traveling or to perform the work again during automatic traveling, and can select either "after end of automatic traveling" or "during automatic traveling". When "after end of automatic traveling" is selected, as illustrated in FIG. 22, after passing through an end point μl of automatic traveling, the tractor 1 automatically moves to the inappropriate range W50 and performs the work again. When "during automatic traveling" is selected, as illustrated in FIG. 22, the tractor 1 acquires the presence of the inappropriate range W50 from the work determiner 40C, and then automatically returns to the inappropriate range W50 to perform the work again.

An agricultural support system as described above includes an unmanned aerial vehicle 70 including a sensor 72, and an agricultural machine (tractor 1), to travel in an agricultural field, wherein the agricultural machine 1 performs work with the working implement 2 based on a state of the agricultural field obtained when the unmanned aerial vehicle 70 senses the agricultural field. With this, the working implement 2 can perform work in accordance with the state sensed by the unmanned aerial vehicle 70 in the agricultural field, and thus workability can be improved.

The agricultural machine 1 may be operable to configure the working implement 2 upon acquiring the state of the agricultural field obtained before the work is performed, and perform the work based on the state of the agricultural field upon acquiring the state of the agricultural field obtained while the work is being performed or after the work is performed. With this, the work can be performed in accordance with the state of the agricultural field detected by the unmanned aerial vehicle 70 before the work, during the work, and after the work.

The agricultural support system may further include a work determiner 40C to determine whether the work with the working implement 2 is appropriate based on the state of the agricultural field obtained while the work is performed or after the work is performed. When the work determiner 40C determines that the work is not appropriate, the agricultural machine 1 returns to a position of the work determined as being not appropriate and performs the work again with the working implement 2. With this, after the work is performed with the working implement 2, it is possible to easily determine whether the work is appropriate. If the work is not appropriate, the work is performed again, and thus it is possible to finally improve the degree of appropriate work in the entire agricultural field.

The agricultural machine 1 may include a traveling controller 40A to control automatic traveling, and a selector 46 to select whether to perform the work again after end of the automatic traveling or to perform the work again during the automatic traveling. With this, when the work is performed during the automatic traveling, it is possible to easily change whether the work is performed again after the automatic traveling or during the automatic traveling.

The agricultural machine 1 may include a cable 77 to supply electric power to the unmanned aerial vehicle 70 flying in the agricultural field. With this, the unmanned aerial vehicle 70 can fly for a long time.

The agricultural machine 1 may include a takeoff/landing station 60 where the unmanned aerial vehicle 70 takes off or lands. The unmanned aerial vehicle 70 may be operable to take off from the takeoff/landing station 60 at at least one of the following points in time: before the work is performed, while the work is being performed, or after the work is performed, and senses the state of the agricultural field while the work is performed and after the work is being performed with the sensor 72. With this, the unmanned aerial vehicle 70 can be caused to take off from the agricultural machine 1 before the work, during the work, and after the work, and the agricultural field, the agricultural machine and so forth can be monitored when necessary.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural support system comprising:
   an unmanned aerial vehicle including a sensor; and
   an agricultural machine to travel in an agricultural field and to attach a working implement thereto such that the working implement is allowed to be raised and lowered;
   wherein
   the unmanned aerial vehicle is operable to:
   fly in a surrounding area of the working implement when the working implement is raised or lowered; and
   when the working implement is being lowered from a raised position, set a flight position of the unmanned aerial vehicle to a position lower than the working implement to allow the sensor to perform sensing; and
   the agricultural machine is operable to perform work with the working implement based on a state of the agricultural field obtained when the unmanned aerial vehicle senses the agricultural field.

2. The agricultural support system according to claim 1, wherein the agricultural machine is operable to configure the working implement upon acquiring the state of the agricultural field obtained before the work is performed, and perform the work based on the state of the agricultural field upon acquiring the state of the agricultural field obtained while the work is being performed or after the work is performed.

3. The agricultural support system according to claim 2, further comprising:

a work determiner to determine whether the work with the working implement is appropriate based on the state of the agricultural field obtained while the work is performed or after the work is completed; wherein
the agricultural machine is operable to, when the work determiner determines that the work is not appropriate, return to a position at which the work was determined to be not appropriate and perform the work again with the working implement.

4. The agricultural support system according to claim 3, wherein
the agricultural machine includes:
 a traveling controller to control automatic traveling; and
 a selector to select whether to perform the work again after the automatic traveling is completed or to perform the work again during the automatic traveling.

5. The agricultural support system according to claim 1, wherein the agricultural machine includes a cable to supply electric power to the unmanned aerial vehicle flying in the agricultural field.

6. The agricultural support system according to claim 1, wherein
the agricultural machine includes a takeoff/landing station where the unmanned aerial vehicle takes off or lands; and
the unmanned aerial vehicle is operable to take off from the takeoff/landing station at at least one of before the work is performed, while the work is being performed, or after the work is performed, and to sense the state of the agricultural field while the work is being performed and after the work is performed with the sensor.

* * * * *